(12) United States Patent
Voorhies et al.

(10) Patent No.: US 11,507,071 B2
(45) Date of Patent: Nov. 22, 2022

(54) AUTONOMOUS ROBOTS PERFORMING CONCERTED OPERATION BASED ON SHARED SENSORY ACCESS AND HOLISTIC FLOW OF INFORMATION

(71) Applicant: inVia Robotics, Inc., Agoura Hills, CA (US)

(72) Inventors: Randolph Charles Voorhies, Culver City, CA (US); Lior Elazary, Agoura Hills, CA (US); Daniel Frank Parks, II, Los Angeles, CA (US); Sagar Pandya, Agoura Hills, CA (US); William Shane Simpson Grant, Van Nuys, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 415 days.

(21) Appl. No.: 16/880,359

(22) Filed: May 21, 2020

(65) Prior Publication Data

US 2020/0278667 A1 Sep. 3, 2020

Related U.S. Application Data

(63) Continuation of application No. 15/945,480, filed on Apr. 4, 2018, now Pat. No. 10,678,228.

(51) Int. Cl.
*G05B 19/418* (2006.01)
*B25J 9/16* (2006.01)
(Continued)

(52) U.S. Cl.
CPC ...... *G05B 19/41895* (2013.01); *B25J 9/0084* (2013.01); *B25J 9/162* (2013.01);
(Continued)

(58) Field of Classification Search
CPC ... G05B 19/41895; B25J 9/0084; B25J 9/162; B25J 9/1664; B25J 9/1697;
(Continued)

(56) References Cited

U.S. PATENT DOCUMENTS 5,672,039 A 9/1997 Perry et al.
8,292,060 B2 * 10/2012 Wunsche ............. B65G 1/1378
198/347.4

(Continued)

*Primary Examiner* — Thomas Randazzo
(74) *Attorney, Agent, or Firm* — Ansari Katiraei LLP; Arman Katiraei; Sadiq Ansari

(57) ABSTRACT

Increased robotic sophistication and more efficient autonomous operation is implemented by providing separate physical autonomous robots shared and remote access to the sensory array and information from the sensory array of one another. Each robot can access a sensor of any other robot, or scans or other information obtained from the sensor of any other robot. The robots leverage the shared sensory access in order to perform batch order fulfillment, dynamic rearrangement of item or tote locations, and opportunistic charging. These coordinated robotic operations based on the shared sensory access increase the efficiency and productivity of the robots without adding resources or hardware to the robots, increasing the speed of the robots, or increasing the number of deployed robots.

20 Claims, 12 Drawing Sheets

(51) Int. Cl.
  *B65G 1/137* (2006.01)
  *G06Q 10/08* (2012.01)
  *G05D 1/02* (2020.01)
  *B25J 9/00* (2006.01)
  *G06Q 50/28* (2012.01)
  *B66F 9/06* (2006.01)
  *G06K 19/06* (2006.01)

(52) U.S. Cl.
  CPC .......... *B25J 9/1664* (2013.01); *B25J 9/1697* (2013.01); *B65G 1/1373* (2013.01); *B66F 9/063* (2013.01); *G05D 1/0276* (2013.01); *G05D 1/0287* (2013.01); *G06Q 10/087* (2013.01); *G06Q 50/28* (2013.01); *G06K 19/06037* (2013.01); *Y10S 901/01* (2013.01); *Y10S 901/08* (2013.01)

(58) Field of Classification Search
  CPC ............ B65G 1/1373; B65G 2203/044; B65G 2209/04; B66F 9/063; G05D 1/0276; G05D 1/0287; G05D 2201/0216; G05D 1/0297; G06Q 10/087; G06Q 50/28; G06K 19/06037; Y10S 901/01; Y10S 901/08
  See application file for complete search history.

(56) References Cited

U.S. PATENT DOCUMENTS

| | | | |
|---|---|---|---|
| 8,682,473 | B1 | 3/2014 | Ramey et al. |
| 9,002,506 | B1 | 4/2015 | Agarwal et al. |
| 9,111,251 | B1 | 8/2015 | Brazeau |
| 2009/0173780 | A1 | 7/2009 | Ramamoorthy et al. |
| 2015/0081088 | A1 | 3/2015 | Lyon et al. |
| 2016/0031644 | A1* | 2/2016 | Schubilske .......... B65G 1/1376 700/216 |
| 2016/0107838 | A1 | 4/2016 | Swinkels et al. |
| 2016/0129587 | A1 | 5/2016 | Lindbo et al. |
| 2016/0176638 | A1 | 6/2016 | Toebes |
| 2016/0304281 | A1 | 10/2016 | Elazary et al. |
| 2017/0121114 | A1 | 5/2017 | Einav et al. |
| 2018/0029797 | A1 | 2/2018 | Hance et al. |
| 2018/0032949 | A1 | 2/2018 | Galluzzo et al. |
| 2019/0138978 | A1* | 5/2019 | Johnson ............... G06Q 10/087 |

* cited by examiner

AUTONOMOUS ROBOTS PERFORMING CONCERTED OPERATION BASED ON SHARED SENSORY ACCESS AND HOLISTIC FLOW OF INFORMATION

CLAIM OF BENEFIT TO RELATED APPLICATIONS

This application is a continuation of U.S. nonprovisional application Ser. No. 15/945,480 entitled "Autonomous Robots Performing Concerted Operation Based on Shared Sensory Access and Holistic Flow of Information", filed Apr. 4, 2018, now U.S. Pat. No. 10,678,228. The contents of application Ser. No. 15/945,480 are hereby incorporated by reference.

BACKGROUND INFORMATION

The ever-increasing sophistication of robots allows them to perform more and more human roles or tasks. Order fulfillment and inventory management is a field that has benefited from this increased robotic sophistication.

With respect to order fulfillment and inventory management, robots may traverse a warehouse or distribution site in order to retrieve different items for fulfillment of different customer orders. The robots identify a path to the locations of the different items, navigate the paths while avoiding collisions with humans and other robots, identify the totes or bins that contain multiple units of an ordered item from warehouse shelving, pull the identified totes, carry the totes back to a station where a human or other robot extracts the desired quantity of items from the totes before the robots return the totes back to the warehouse shelving. This is one example of a workflow that the robots can autonomously perform.

The robots depend on multiple sensors, actuators, motors, mechanical components, processors, and algorithms to complete these tasks. As robotic sophistication increases, the efficiency by which the robots can complete the tasks increases, thereby enabling each robot to complete more tasks in less time using the same sets of resources (e.g., sensors, motors, mechanical components, processors, and algorithms). As relating to order fulfillment, the increased efficiencies reduce the average time to retrieve each tote, which in turn, allows the same number of robots to fulfill more orders in the same amount of time, thereby reducing overall cost of the warehouse administrator.

One specific area where there is lack of sophistication is robot interaction. For the most part, robots operate independent of one another. Each robot sets about completing its set of assigned tasks without accounting for what other robots are doing. They use their sensors to detect and avoid colliding with one another when in physical proximity with one another, but they do not coordinate their operations with each other.

Thus, there is a need to shift the robots away from operating independently on a task-by-task basis. There is a need for the robots to better and more directly collaborate with one another, and to intelligently and dynamically account for actions taken by other robots regardless of where those robots are in the warehouse.

By addressing these needs, robot efficiency can be greatly increased. Redundant tasks performed by different robots at different times can be batched and performed at one time by one robot. The robots can simultaneously optimize the space in which they operate and the resource with which they operate such that that the resources they need to access are more frequently available and require less time to access.

DETAILED DESCRIPTION OF PREFERRED EMBODIMENTS

The disclosure is directed to robotics, and more specifically, to increasing the functionality and sophistication of robots such that a set of autonomous robots operating in a common space are able to complete tasks more efficiently without added resources or physical modification (e.g., addition of new sensors). In the particular case of order fulfillment robots, the objective is for the robots to reduce average retrieval time of items and increase order fulfillment rates without increasing the speed of the robots or the number of deployed robots.

In some embodiments, the increased robotic functionality and sophistication stem from opening a holistic flow of information between the robots, a robot management system, and other beacons or sensors distributed across a warehouse or common site in which the robots operate. The holistic flow of information is itself the byproduct of providing each particular robot wireless real-time access to the sensory array (or the information that is accessible from the sensory arrays) of other robots, a robot management system, and other beacons and sensors distributed across a warehouse. Consequently, the autonomous decisions, movements, and actions performed by a robot can now be conditioned on more that the information that is obtained from the sensory array of the robot. By accessing the holistic flow of information and sensors of other robots, the robots can make better autonomous decisions that lead to more efficient movements and actions, and operate more as a collective swarm rather than independent robots performing independent tasks.

Batch order fulfillment, dynamic rearrangement of item or tote locations, dynamic relocation of order fulfillment destinations, and opportunistic charging are some of the efficiencies realized from enabling one robot to wirelessly access, in real-time, the sensors (or information from the sensors) of other robots, the robot management system, and other sensors distributed across the warehouse.

Figure 1:
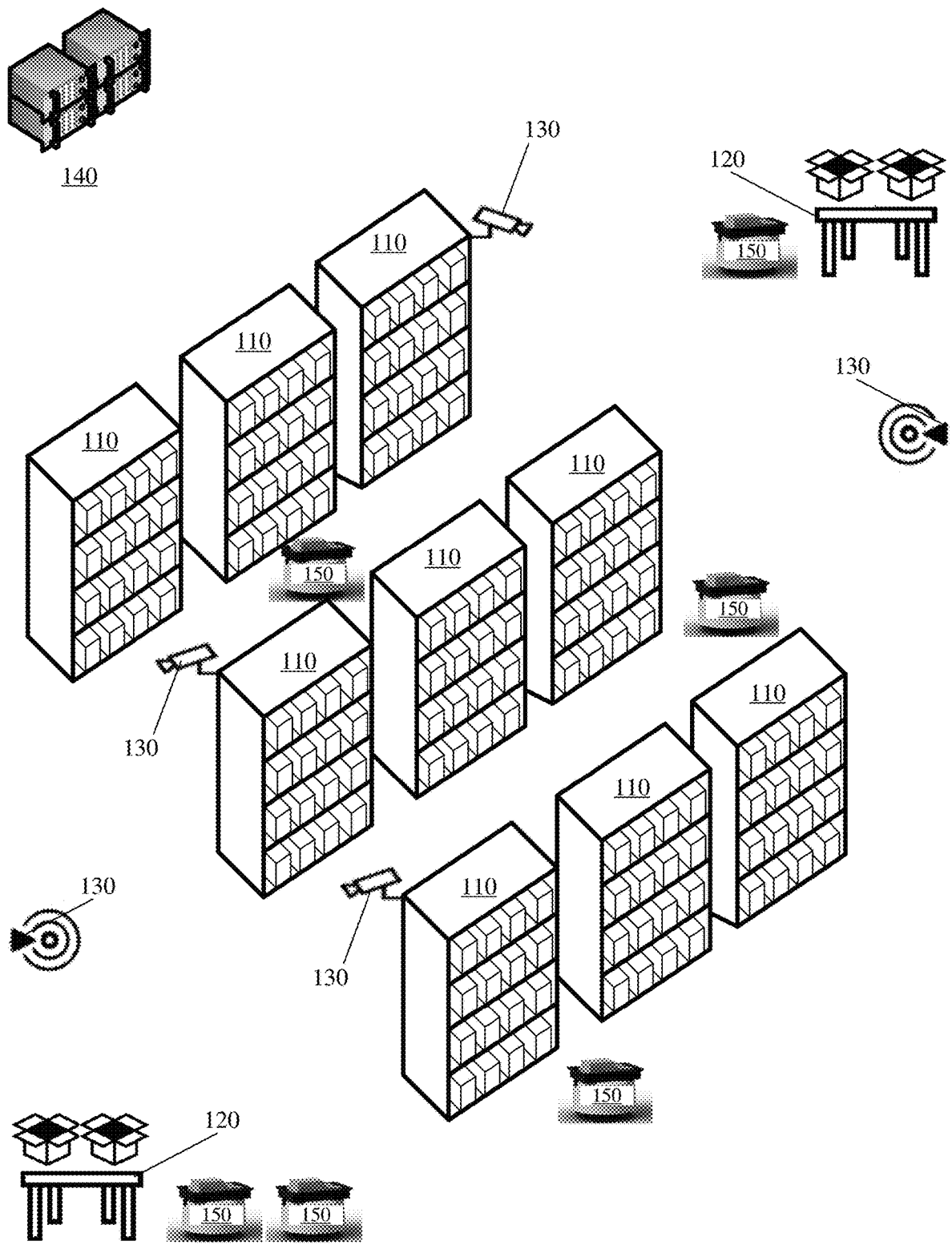
FIG. 1 illustrates the hardware or physical components for robotic order fulfillment in accordance with some embodiments.

FIG. 1 illustrates the hardware or physical components for robotic order fulfillment in accordance with some embodiments. The figure illustrates shelving 110, a set of order fulfillment stations 120, sensors and beacons 130 distributed about the warehouse, a robot management system 140, and a distributed set of order fulfillment robots 150.

The shelving 110 stores the warehouse inventory. The shelving is typically a set of racks with different rows onto which different items are arranged. In some embodiments, multiple units of one or more items are stored within individual totes or bins that are placed about the shelving 110. The shelving 110 arranges the items or totes horizontally and vertically. In some other embodiments, boxes, containers, dispensers, cabinets, and other organizers can be used to store items or totes.

Figure 2:
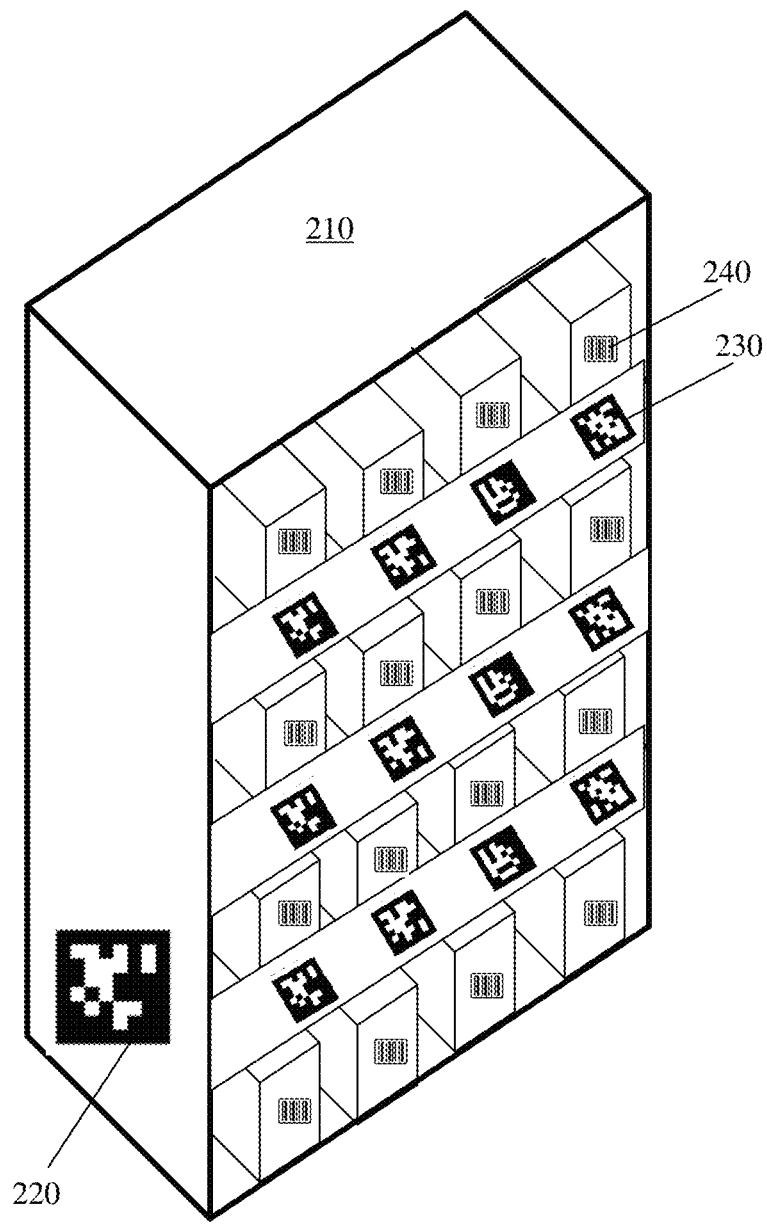
FIG. 2 conceptually illustrates a shelf with various identifiers in accordance with some embodiments.

Identifiers (e.g., barcodes, fiducials, or other markers) are used to differentiate the shelving 110, different locations or slots about the shelving 110, and specific totes or items at different shelving 110 locations. FIG. 2 conceptually illustrates a shelf 210 with various identifiers in accordance with some embodiments. The shelf 210 has a first identifier 220 to identify this particular shelf and differentiate it from other shelves in the warehouse. About the face of the shelf 210 and along each row is a different set of visual markers 230 identifying different shelf slot locations or other information about shelving positioning (e.g., positional coordinates). The shelf 210 stores various totes that are identified with a third set of identifiers 240. The combination of a tote identifier 240 and an adjacent slot identifier 230 is one means by which the robot management system 140 and robots 150 can map the location of the totes about the shelves. Multiple identifiers can be used to encode a message. Although shown as visual identifiers in FIG. 2, other identifiers can be used in similar fashion. For example, acoustic signals or light (e.g., light pulses or different colored light) can be used to convey the identifier information.

With reference back to FIG. 1, the order fulfillment stations 120 are static or dynamic locations within the warehouse at which customer orders are fulfilled based on different items or totes the set of robots 150 retrieve from the shelving 110. A different second set of picking and packing robots can be at the stations 120, and perform the item picking, packing, and order aggregation tasks. Alternatively, humans can perform the picking, packing, and order aggregation tasks at the stations 120. The stations 120 can be desks, tables, conveyers, or racks to which different items or totes of one or more customer orders are aggregated from different shelving 110. In some embodiments, the stations 120 are motorized so as to allow the stations 120 to move to different locations within the warehouse as needed. In some other embodiments, the stations 120 have wheels. One or more of the robots 150 can push the stations 120 to relocate them within the warehouse.

The sensors or beacons 130 are distributed about the warehouse. The sensors or beacons 130 contribute to the holistic flow of information in the warehouse. The sensors or beacons 130 may provide information about a location, shelving, tote, or item. For instance, the sensors or beacons 130 can emit a signal that is detectable by at least one sensor of the robots 150. The signal can be visual, acoustic, or some form of data packet. The signal can be encoded to convey coordinates, alphanumeric identifiers (e.g., names), identifiers encoded with specific information, images, or other data. The sensors or beacons 130 can also be used to track activity within the warehouse. In particular, the sensors or beacons 130 can track robot 150 movements, retrieval of items or totes from particular locations of the shelving 110 or stations 120, delivery of items or totes to particular locations of the shelving 110 or stations 120.

The robot management system 140 is a set of one or more special purpose machines for receiving customer orders over a digital network, such as the Internet, for managing warehouse inventory, and for assigning tasks to the robots based on the received customer orders. The robot management system 140 is communicably coupled to the set of robots 150 via a wireless network such as WiFi, 4G Long Term Evolution, or other medium-to-long range wireless network. In some embodiments, the robot management system 140 receives sensor information from one or more robots 150 and forwards that information to the other robots that request or need that information, wherein the robot management system 140 can broadcast sensor information from a first robot to the other robots as one means for providing the other robots shared robot sensory access to the sensor of the first robot. The robot management system 140 may also be communicably coupled to the sensors or beacons 130 in order to better track events within the warehouse.

Each robot of the distributed set of robots 150 is an autonomous machine that moves and performs one or more of tasks within the warehouse. The tasks may include retrieving items or totes (e.g., containers containing multiple units of one or more items) from the shelving 110, returning the retrieved items or totes to the proper order fulfillment stations 120, picking items from totes at an order fulfillment station 120, packing picked items, returning the items or totes to the shelving 110, and other autonomous actions. In some embodiments, the robots 150 have one or more actuators, engines, or motors to create a motive force. This can include actuators, engines, or motors coupled to and controlling wheels, legs, tracks, or propellers, a retriever for retrieving items or totes, and/or a lift for changing the vertical height of the retriever or robot sensors. The retriever can be a mechanical arm with a grabber claw, a vacuum, an electromagnet, or other means for grabbing or retrieving items and totes. The robots 150 may also have at least one onboard battery powering these components.

Each robot 150 has an onboard sensory array. The sensory array is a collection of different sensors. The sensory array of a robot includes one or more of camera, LiDAR (light detection and ranging), flash LiDAR, structured light transmitter and receiver, radar, microphone, accelerometer, inertial sensor, wheel or motion encoder, structured-light stereo depth camera, depth scanner, time-of-flight sensor, compass, and other sensory instruments. This is not meant to be an exhaustive listing as the sensory array can include other sensors with which the robot can observe the world around it, move without collision in that world, and perform actions on different objects observed in that world. In relation to the set of robots 150 performing order fulfillment operations, the sensory array of a particular robot allows it to detect the shelving 110, totes, other robots, and other physical objects around the particular robot, the identifiers identifying the shelving 110 and totes, and the signals that are emitted from the beacons. The sensory array can also track movements and actions of the particular robot. The sensors are communicably coupled to a central processor and memory.

Each robot 150 also has one or more transceivers or wireless radios for wireless communication with other robots, the robot management system 140, and the other sensors and beacons 130 distributed across the warehouse. The robots 150 can wirelessly receive tasks and other instructions from the robot management system 140 via the transceiver. The transceiver can also be used to monitor or track movements, actions, or state of the robots 150. The transceiver also enables the shared robot sensory access, whereby the robots 150 extend beyond their own sensory array, and have shared access to the sensory array of other robots 150 as well as the sensors or beacons 130. In some such embodiments, the shared robot sensory access involves a first robot directly receiving information from a sensor of a different second robot. The first robot can send a request to the second robot for information from the sensor or the first robot can wirelessly receive an information feed from the second robot sensor at a specific address and port combination. In some other embodiments, the shared robot sensory access involves the first robot indirectly receiving information from a sensor of the second robot. In this indirect case, the sensor of the second robot captures the information. The information is passed to the robot management system 140 where it can be accessed by the first robot. Alternatively, the second robot or the robot management system 140 wirelessly broadcasts the information in the warehouse such that the first robot and any other robot can receive the information from the sensor of the second robot.

Some embodiments limit the sensory information that is broadcast based on various triggering events performed or detected by the robots. For instance, when a robot retrieves a tote from a particular shelf, the robot uses one or more of its onboard sensors (e.g., camera) to scan the tote identifier as well as the identifier for the shelf location at which the tote was retrieved. The tote retrieval can be a triggering event that causes the robot to provide, distribute, or otherwise broadcast those scans to the other robots. The broadcasted identifiers effectively provide the other robots with temporary and/or real-time access to another robot's sensors even though the other robots do not directly access the sensors of another robot. In this example, the broadcasted identifiers notify the other robots that the shelf location is now available or open, and that the tote is no longer associated with that shelving location.

Figure 3:
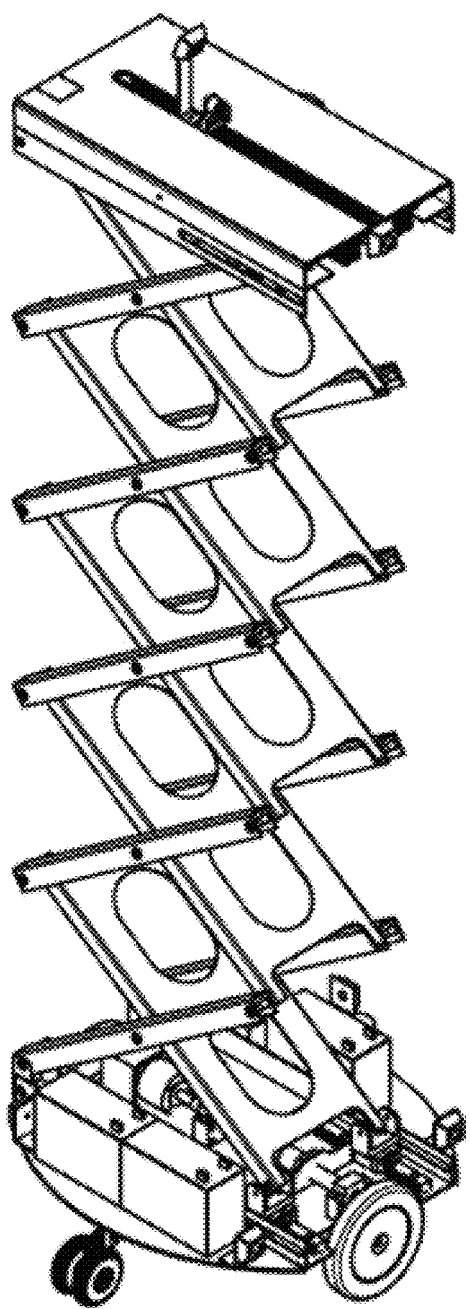
FIG. 3 illustrates an example of an order fulfillment robot in accordance with some embodiments.

FIG. 3 illustrates an example of an order fulfillment robot in accordance with some embodiments. U.S. Pat. No. 9,120, 622 further describes the components of an example order fulfillment robot. The disclosures of U.S. Pat. No. 9,120,622 are incorporated herein by reference. The robots 150 can have other forms, components, and functionality not explicated identified in FIG. 3 or enumerated in U.S. Pat. No. 9,120,622. For example, the robots 150 can be aerial or bipedal autonomous machines.

The disclosures below present various embodiments based on the shared robot sensory access, and leveraging the shared robot sensory access for increased robotic functionality and sophistication. In particular, the disclosures below describe adapted robotic operation for more efficient item or tote retrieval and order fulfillment based on shared wireless access that each robot has to sensors or information from the sensors of other robots, the robot management system, and other sensors or beacons distributed across the warehouse.

Figure 4:
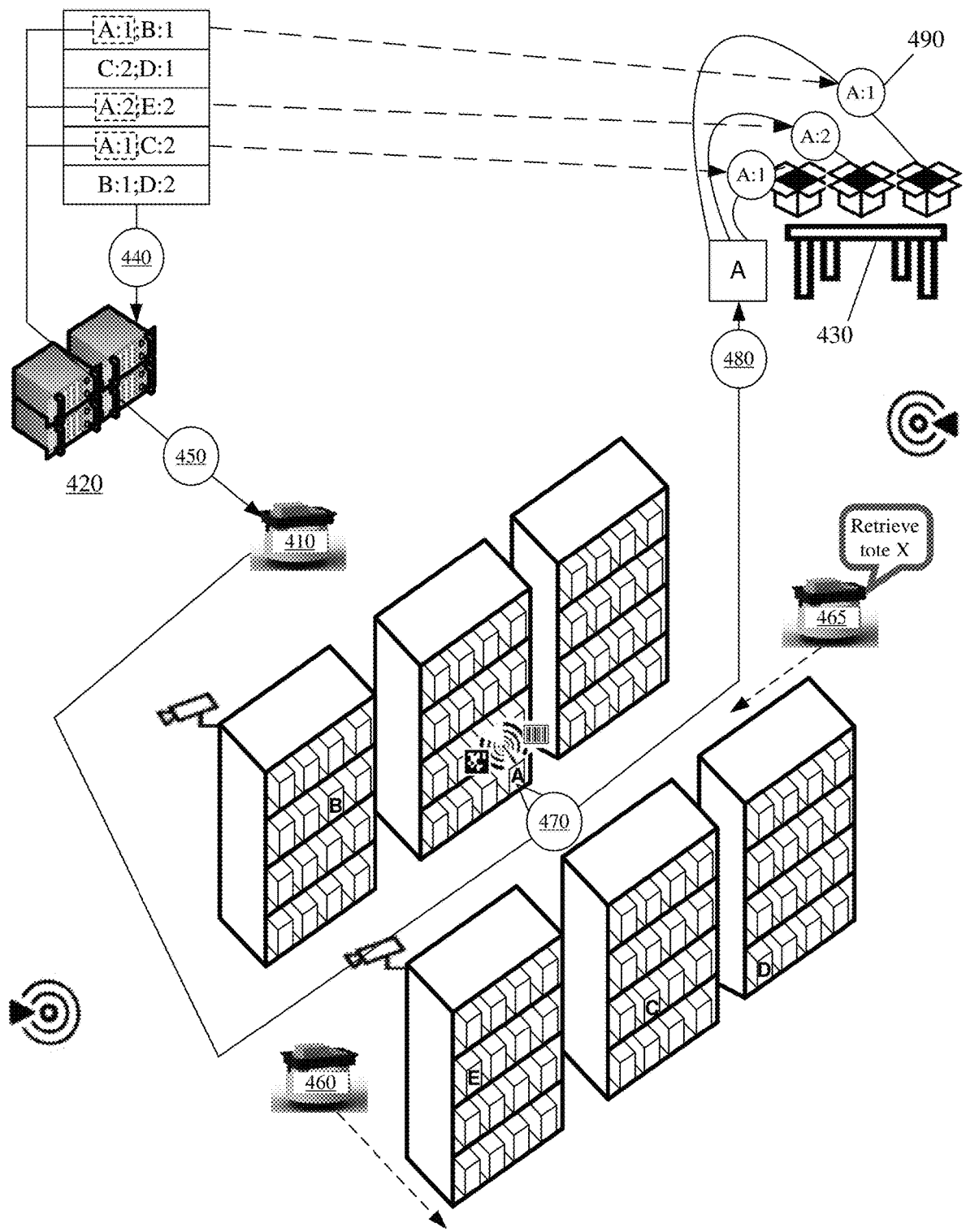
FIG. 4 illustrates example operation of a robot performing batch order fulfillment in accordance with some embodiments.

FIG. 4 illustrates example operation of a robot performing batch order fulfillment in accordance with some embodiments. The figure illustrates batch order fulfillment as collaborative operations between the robot 410, the robot management system 420, and an order fulfillment station 430, wherein the collaborative operations result from the holistic flow of information between the robot 410, robot management system 420, and order fulfillment station 430.

The batch order fulfillment eliminates redundant retrievals of the same item or tote by the same or different robots at different times. As shown, the robot management system 420 does not deploy one or more robots to retrieve the items of different customer orders as those orders are received (at 440) by the robot management system 420. In other words, the orders are not sequentially fulfilled in the order they are received. The robot management system 420 queues the customer orders that are received over some period of time. The period of time can be over the past one or more hours, past one or more days, or overnight when order fulfillment is not occurring.

The robot management system 420 analyzes the orders in order to identify a subset of the set of customer orders that include a common item. Each order of the subset of customer orders may be received at different times with one or more other orders in between.

The sensory array of different robots in the warehouse can be remotely accessed in order to detect, in real-time, the position, direction of movement, and any tasks each robot in the warehouse is currently performing. For instance, a camera of each robot can be activated in order to scan a nearby identifier that reveals the current location of the robot. A compass, inertial sensor, camera, or other sensor can be used to detect whether each robot is moving, the direction of movement, or if the robot is stationary. Actuator sensors can be used to detect what, if any, task a robot is performing. For instance, activation of the robot retriever can be used to detect that the robot is actively retrieving a tote. From this real-time holistic flow of information, the particular robot 410 that can most efficiently retrieve the tote containing multiple units of the common item is selected and assigned (at 450) the task to retrieve the tote that contains multiple units of the common item to fulfill in part each order from the subset of orders. The selection can be based on a collective decision made amongst the robots through the shared sensory information, or a decision made by the robot management system based on the real-time holistic flow of information obtained from the robots, and more specifically, the remote access to the sensory array of each robot. The selected robot may be the robot that is closest to the item or tote location, that is traveling or oriented in the correct direction as the tote location, and that is available in terms of not actively performing one or more other tasks.

As shown in the figure, the selected robot 410 is not necessarily the closest robot to the tote location as there are first and second robots 460 and 465 that are physically closer. However, remote access to the sensory array of the first robot 460 reveals that the first robot 460 is traveling away from the tote location. The physical location of the first robot 460 can be obtained from remotely accessing the first robot 460 camera and scanning a nearby location identifier, accessing a geolocation receiver of the first robot 460, or accessing another sensor of the first robot 460 that receives location information from a nearby beacon. The orientation and direction of movement can be obtained from remotely accessing an inertial sensor (e.g., accelerometer or gyroscope) and compass of the first robot 460. Stopping and turning the first robot 460 could incur too much delay and may create obstacles preventing the movement of other robots. Accordingly, the information obtained from the sensory array of the first robot 460 disqualifies it from the retrieval of the common item tote. From remote and shared access to the sensory array of the second robot 465, the second robot 465 is also determined to be physically close to the tote location and is traveling in the correct direction. However, the second robot 465 is currently performing a different retrieval task. Rather interrupt operation of the second robot 465, the system selects the third robot 410 that is able to the arrive at and retrieve the tote in the least amount of time based on its physical proximity to the tote location, travel orientation, and availability.

The selected robot 410 retrieves (at 470) the tote containing multiple units of the common item from the shelf location and delivers (at 480) the tote to the order fulfillment station 430. Another robot or human worker at the order fulfillment station 430 extracts (at 490) a quantity of the item from the tote that satisfies each order in the subset of orders. As shown, a first order of the subset of orders purchases one unit of the item, a second order of the subset of orders purchases two units of the same item, and a third order of the subset of orders purchases one unit of that same item. Accordingly, four units are picked out from the tote at one time, and the four units are used to partially fulfill each of the first, second, and third orders based on the single retrieval of the tote.

Additional units of the common item beyond the quantity ordered in the subset of customer orders can also be picked at the order fulfillment station for future or expected customer orders that are expected to arrive later in that day. The robot management system can rely on heuristics to determine the future demand and the number of additional units to extract. For instance, a particular item may be ordered on average ten times a day. A first order for a single unit of the particular item is received. A robot retrieves the tote containing some quantity of the particular item and delivers the tote to an order fulfillment station. Rather than extract just the single unit to fulfill the first order, ten units of the particular item are extracted from the tote at the order fulfillment station. One unit is used to fulfill the first order and the remaining nine units are retaining for subsequent orders.

After extraction, the selected robot can then return the tote to the shelving from which it was retrieved. In some embodiments, a different robot returns the tote as it is more efficient for the selected robot to drop off the tote at the order fulfillment station and set about performing other tasks rather than wait for the quantity of items to be extracted from the tote.

Further efficiencies are realized because the batch order fulfillment allows for the out-of-order fulfillment of customer orders and retrieval of totes. Batch order fulfillment is predicated on queuing some number of customer orders to identify commonality of items in the different orders. The queue of customer orders allows the robots and robot management system to perform the out-of-order retrieval of totes, wherein the out-of-order retrieval reduces average tote retrieval time by allowing the robots to retrieve totes that are closest to their location. For instance, as a robot returns a previously retrieved tote to the warehouse shelving, the retrieval of totes is made out-of-order such that the robot does not retrieve a tote for a next received customer order that may be far away. Instead, the robot retrieves a closer tote for a customer order that have arrived later and has been queued.

Figure 5:
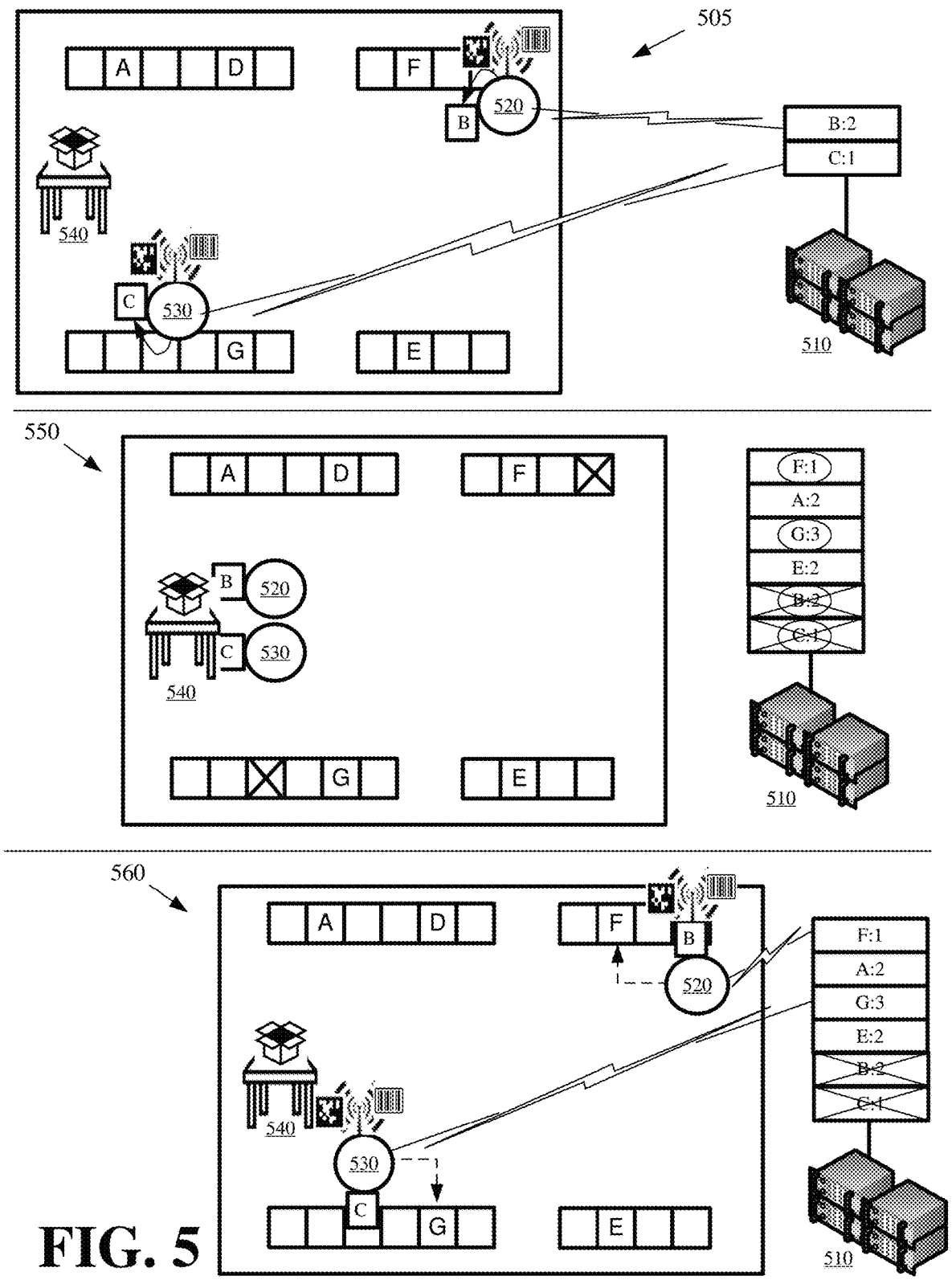
FIG. 5 conceptually illustrates the out-of-order retrieval of orders based on the shared robot sensory access of some embodiments.

FIG. 5 conceptually illustrates the out-of-order retrieval of orders based on the shared robot sensory access of some embodiments. The figure illustrates the robot management system 510 receiving an initial set of orders at a first interval 505 and a set of robots 520 and 530 retrieving the totes containing the ordered items from a first set of storage locations.

As the robots 520 and 530 retrieve the totes for the initial set of orders to an order fulfillment station 540, the robot management system 510 queues a second set of customer orders that arrive during a second interval 550. The robot management system 510 determines the items of each of the second set of customer orders as well as the tote placement for those items in the warehouse shelving.

At the start of the third interval 560, the robots 520 and 530 return the totes for the initial set of customer orders back to the first set of storage locations. The robot management system 510 leverages the shared robot sensory access to determine which of the totes for the pending customer orders are closest to the location of the robots 520 and 530. Location and availability of a robot is identified in response to the robot using one or more of its sensors (e.g., camera, scanner, etc.) to scan a first identifier for a tote that the robot is returning to a particular shelf location and a second identifier identifying the particular shelf location. The first scan reveals that the robot is returning a tote and is now free for another task. The second scan reveals the robot's location relative to the storage locations. The one or more sensors of the robot performing the scans or the information produced from these sensors are shared with and made accessible to the robot management system 510. Based on accessing this sensory information from the robots 520 and 530, the robot management system 510 identifies the closest totes that are pending retrieval, and issues instructions for the robots 520 and 530 to perform an out-of-order retrieval of those totes, such that the robots 520 and 530 travel a minimal distance to complete the retrievals. For instance, robot 520 is tasked with retrieving the tote containing item "F" which is pending retrieval and closest to the storage location to which robot 520 returns the tote containing item "B", even though the customer order for item "F" was last to arrive in the order queue. Robot 530 is tasked with retrieving the tote containing item "G" which is pending retrieval and closest to the storage location to which robot 530 returns the tote containing item "C", even though the customer order for item "G" is not the next order in the order queue. Other robots (not shown) can be deployed to retrieve the more distant totes.

In some embodiments, the robot management system distributes the list and location of totes that are pending retrieval to the robots. The robots can then decide amongst themselves as to the most efficient out-of-order retrieval of those totes. The shared robot sensory access allows a first robot to determine that, even though it is close to a tote pending retrieval, the sensors of a second robot show that a second robot is closer to that tote. The first and second robots do not both attempt to retrieve the same tote. By having sensory access that allows the first robot to determine the second robot's position, the first robot defers retrieval of the tote to the second robot, and selects a different task to complete while still accounting for the movements and activities of the other robots.

Figure 6:
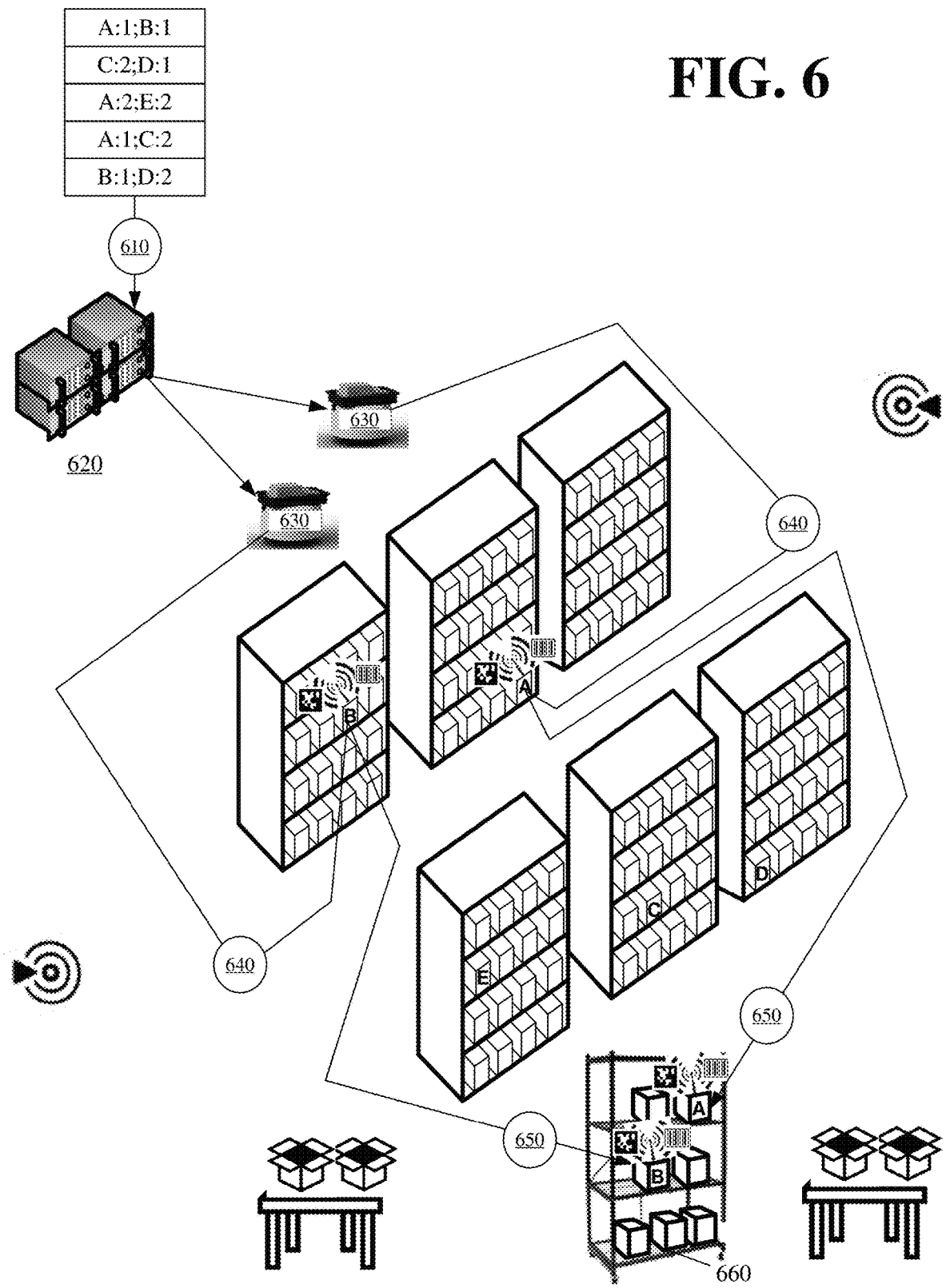
FIG. 6 illustrates an alternative manner with which the robots perform batch order fulfillment from the shared robot sensory access and the real-time holistic information flowing between the robots in accordance with some embodiments.

FIG. 6 illustrates an alternative manner with which the robots perform batch order fulfillment from the shared robot sensory access and the real-time holistic information flowing between the robots in accordance with some embodiments. Here again, an interval passes during which a set of customer orders are queued (at 610) at the robot management system 620. The robots 630 set about retrieving (at 640) the totes for ordered items from the warehouse shelving. However, rather than deliver individual totes to one or more order fulfillment stations, the robots 630 aggregate (at 650) the retrieved totes to a "pick wall" 660.

In some embodiments, the pick wall 660 is a local cache for totes containing requested and popular items. In some embodiments, the pick wall 660 is a rack at or near one or more of the order fulfillment stations.

Before placing a retrieved tote to the pick wall 660, each robot 630 identifies a free location or slot on the pick wall 660 where the tote can be placed. The location of the tote about the pick wall 660 is then temporarily registered so that other robots or humans wanting access to the tote can easily locate it without searching the pick wall 660.

The free location is identified based on the shared robot sensory access. In particular, each time a robot 630 places a tote in a free slot of the pick wall 660, the robot 630 scans with a particular sensor (e.g., camera) an identifier marking the free slot, scans, with the same or different sensor, an identifier identifying the tote being placed in the free slot, and associates the two scans. These scans are conveyed to the robot management system 620 or the other robots 630 by way of the shared robot sensory access. Consequently, each robot 630 knows the locations of totes about the pick wall 660 as well as the free slots remaining on the pick wall 660 based on scans obtained from the sensors of the robots 630.

Over time, the pick wall 660 is populated with the totes that contain the items for multiple customer orders. Batch order fulfillment is achieved as a result of a common item for different customer orders being picked from a tote at the pick wall 660 at different times based on a single retrieval of that tote to the pick wall 660.

The pick wall may become full as more and more orders are received and the diversity of ordered items increases. In such cases, the robots preserve batch order fulfillment by communicating with the management system as well as the order fulfillment stations to identify totes that are no longer needed or contain least frequently ordered items. For instance, the robots may populate the pick wall with the totes that contain items for customer orders received the last hour. The workflow management system updates the robots with orders that are received during the current hour and that include items contained in totes currently at the pick wall. The robots refer to the scan list obtained from the shared robot sensory access, and avoid removing the totes that are still needed for orders received during the current hour. The robots do, however, remove totes that are not needed for the current hour from the pick wall based on the holistic flow of information between the robots and the robot management system. Once again, each robot uses a first sensor to scan an identifier identifying the tote being removed from the pick wall while also scanning, with the first sensor or a second sensor, a different identifier identifying the pick wall location from which the tote is being removed. Sharing the scans for the tote being removed from the pick wall with the other robots, identifies, for the other robots, the newly opened slots about the pick wall. The other robots can then retrieve and return new totes to open slots about the pick wall without having to independently scan the pick wall for an open slot or guess as to whether there are any open slots at the pick wall. In other words, the shared robot sensory access allows each robot to keep a real-time map of the available and unavailable storage locations about the pick wall and other shelving within the warehouse.

In some embodiments, the robots preemptively keep a certain number of slots open at the pick slot based on the holistic flow of information and shared robot sensory access. In particular, a first robot may place a tote at the pick wall and register the tote-to-pick wall placement. Before leaving the pick wall, the first robot references the scans obtained from the sensors of other robots. The first robot determines, from the shared scans or shared sensor access, that the number of remaining open slots at the pick wall is less than a desired number. This determination is made in real-time without the first robot scanning the entire pick wall for open slots. The first robot queries the robot management system for arrival of any new orders in order to identify items in totes that are not currently placed at the tote wall. If there is a newly received order implicating a tote that a second robot is retrieving, the first robot references the scans again to identify a tote at the pick wall that is no longer needed as well as a registered location of that tote about the pick wall. The first robot removes that tote, and reports the newly opened slot to the other robots by way of the shared robot sensory access. The second robot can then directly return the newly implicated tote to the slot newly opened by the first robot without independently scanning the pick wall for locations of open slots and without having to wait for a slot to open at the pick wall upon the second robot arriving at the pick wall.

The batch order fulfillment as well as the out-of-order retrieval based on the shared robot sensory access and real-time holistic flow of information established between the robots and the robot management system achieves the objective of reducing the number of times any given tote is retrieved and returned. Consequently, the robots are able to retrieve totes for a greater number of customer orders, which in turn, expedites the rate at which those customer orders are fulfilled and increases the overall order fulfillment rate without increasing the number of robots or the speed of the robots.

Another means by which the shared robot sensory access and real-time holistic knowledge can be leveraged for increasing order fulfillment is the dynamic rearrangement of tote locations with the robots. Traditional order fulfillment or retrieval robots retrieve a tote from a specific location and return that tote to the same location once the desired items are extracted from the tote.

Returning the totes to the same location simplifies inventory management. It allows for a static mapping of the tote locations. This static map is provided to each of the robots so that the robots know exactly where to go and at what specific shelf location to retrieve each tote from. This static mapping and static tote placement are however suboptimal and inefficient.

A highly popular item may have a location that is at an opposite end of a warehouse from where the order fulfillment stations are. For each retrieval of the popular item, the robots would traverse the entire warehouse to deliver the tote to the order fulfillment station and traverse the entire warehouse again to return the tote to its static location. Meanwhile, an item that is rarely demanded can be located near the order fulfillment stations such that the retrieval and return time for the tote containing the rarely demanded item is significantly less (e.g., several minutes less).

Some embodiments leverage the shared robot sensory access and the real-time holistic information flowing between the robots to provide a dynamic and continually changing mapping for the tote locations instead of a static mapping. The robots produce the dynamic mapping from continually and collaboratively rearranging tote locations as the robots conduct each tote retrieval and tote return. The ever-changing mapping of tote locations is conveyed in real-time to the robot management system and all other robots by sharing access to the robot sensors or information from those sensors recording the new tote locations. In so doing, the robots, as part of their tote retrieval and return operations, eliminate the inefficiencies of having static tote locations in a warehouse, which in turn, leads to a greater order fulfillment rate and more efficient usage of the robots. These efficiencies are achieved without increasing the number of robots deployed in the warehouse, the speed with which the robots operate in the warehouse, or any other resource in the warehouse.

Figure 7:
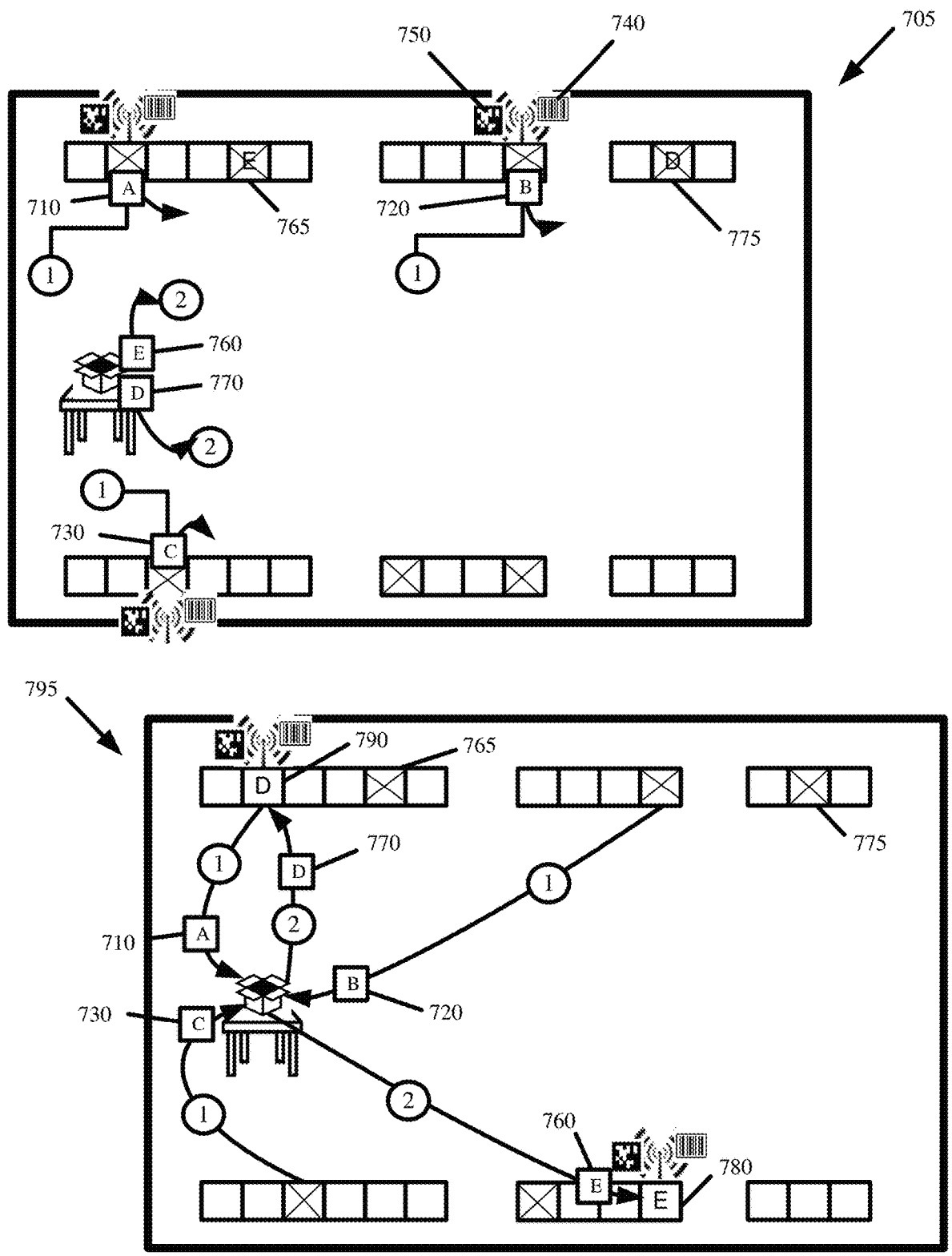
FIG. 7 illustrates robots dynamically rearranging inventory in a warehouse based on the shared robot sensory access and the real-time holistic flow of information between the robots in accordance with some embodiments.

FIG. 7 illustrates robots dynamically rearranging inventory in a warehouse based on the shared robot sensory access and the real-time holistic flow of information between the robots in accordance with some embodiments. The figure illustrates a first set of robots identified by reference marker "1", a second set of robots identified by reference marker "2", and different open slots within warehouse shelving identified as boxes with an "X".

Each robot of the first set of robots is tasked with retrieving (at 705) a different tote from a first set of totes 710, 720, and 730. The first set of totes 710, 720, and 730 contains items for fulfilling pending customer orders. As each robot of the first set of robots retrieves a tote from the first set of totes 710, 720, and 730, the robot scans, with a first sensor, an identifier (i.e., 740) of the tote to ensure that it is retrieving the tote containing the correct item. Each robot also scans, with the first sensor or a different second sensor, a different identifier (i.e., 750) identifying the position of the tote on the shelving where the tote is located. This second scan identifies a slot within the warehouse shelving that opens or that is made available as a result of a tote retrieval. The shared robot sensory access makes these sensors, scans, or the corresponding information accessible to the other robots either directly or indirectly via the robot management system.

The second set of robots access the sensors, scans, or information from the first set of robots in order to dynamically rearrange tote positions when returning (at 795) a second set of totes 760 and 770 from the order fulfillment stations back to the warehouse shelving. Although the second set of totes 760 and 770 may be returned to the original shelving locations (see 765 and 775) from which they were retrieved, FIG. 7 illustrates the second set of robots returning the second set of totes 760 and 770 to other locations (see 780 and 790).

Each robot of the second set of robots scans, with an onboard sensor, an identifier of a tote 760 or 770 from the second set of totes that the robot is tasked with returning (at 795) back to the warehouse shelving. From the scan, the robot identifies the items contained in the tote 760 or 770. The robot uses the holistic flow of information between the robots and the robot management system to determine the demand for the items in the tote 760 or 770. In some embodiments, the demand is derived from the shared robot sensory access. Specifically, the robots can track demand for an item based on how many times the tote containing those items is retrieved by a robot throughout a day relative to other item containing totes, wherein each retrieval is tracked based on a scan from a sensor of a robot retrieving the tote, with the scan being shared with the other robots as a result of the shared robot sensory access.

The second set of robots then select open slots to return the second set of totes 760 and 770 to based on the different demands associated with each tote of the second set of totes 760 and 770 and the proximity of the open slots to one or more order fulfillment stations. The greater the demand for the items in a particular tote, the closer that particular tote should be placed to an order fulfillment station. The closer placement to an order fulfillment station decreases the time it takes to subsequently retrieve these frequently requested totes from the warehouse shelving back to the order fulfillment stations. More specifically, the second set of robots may place totes with the highest demand in open slots of shelving that are physically closest to one or more order fulfillment stations. The opposite is also true. The lower the demand for items in a particular tote, the farther that particular tote may be from the order fulfillment stations.

Once a slot location is selected by each robot of the second set of robots, the robot can signal the other robots that the selected slot location is reserved for a tote being returned by that robot, before the robot physically moves the tote to the slot location. The robot can wirelessly transmit the identifier of the tote being returned and the identifier of the selected slot location in order to reserve that slot location. Reserving the slot location prior to returning the tote to that slot location ensures that the robot does not waste effort moving to the slot location only to find another robot has already returned a different tote to that slot location.

The second set of robots are made aware of the identifiers for the open slots across the warehouse shelving without having scanned those identifiers or visited those locations. The open slot information is conveyed based on the holistic flow of information between the robots that is facilitated through the shared robot sensory access. In particular, the second set of robots receive the identifiers for the slots opened by the first set of robots as a result of the first set of robots, sharing with the second set of robots, scans of the identifiers from which the first set of robots retrieve totes.

In FIG. 7, the demand for tote 760 has decreased while the demand for tote 770 has increased. Accordingly, tote 760 is returned (at 795) to location 780, instead of location 765 from where it was last retrieved, because of the decreased demand. Location 780 is further from the order fulfillment station than location 765. Location 780 is also a location that newly opened as a result of a retrieval by the first set of robots. Tote 770 is returned to location 790, instead of location 775 from where it was last retrieved, because of the increased demand. Location 780 is closer to the order fulfillment station than location 775.

In FIG. 7, the dynamic rearrangement is based on tote demand. The totes with items in greater demand are moved closer to the order fulfillment stations and the totes with items in lesser demand are move further away from the order fulfillment stations.

Figure 8:
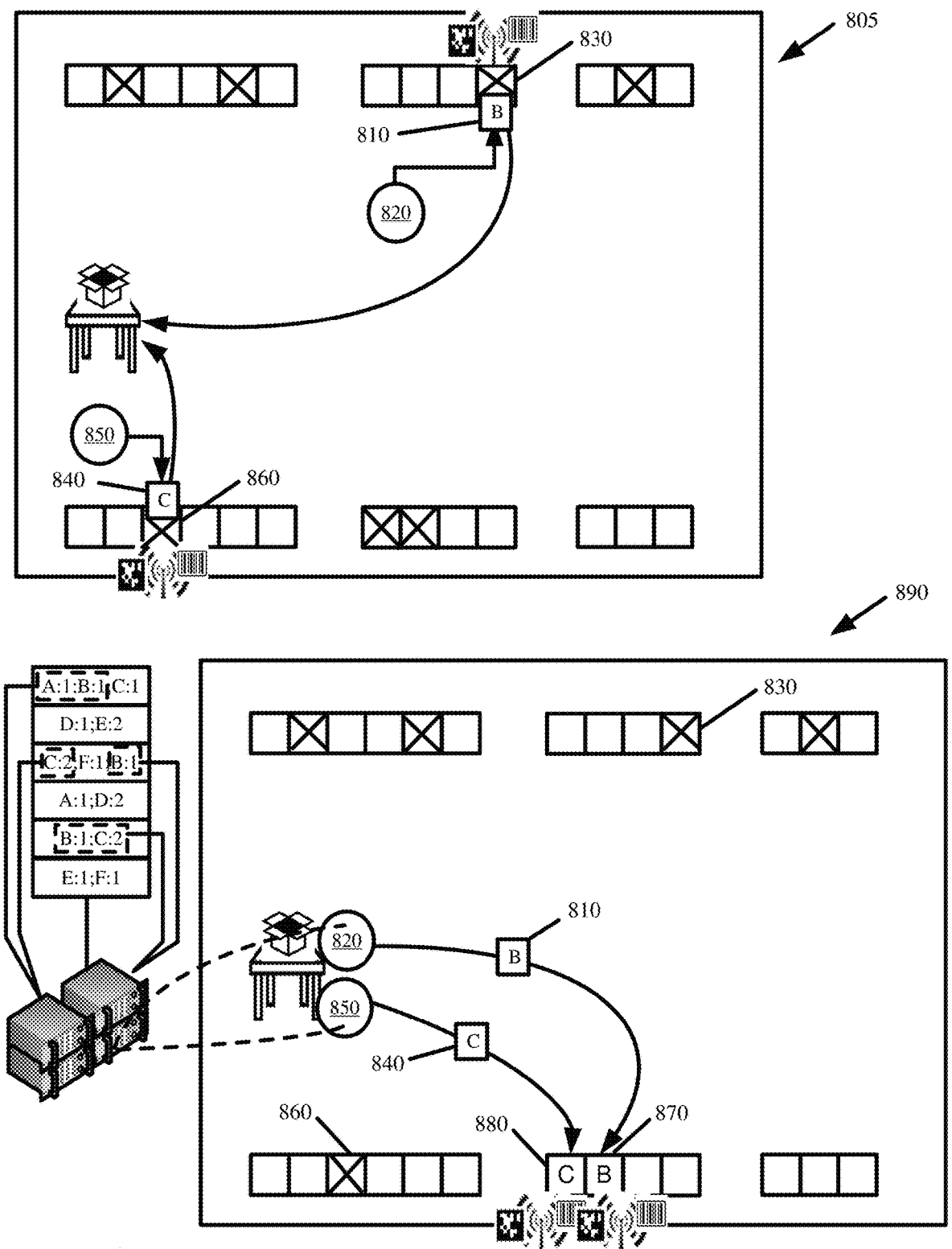
FIG. 8 illustrates an example operation of robots dynamically rearranging tote locations in response to order patterns derived from the holistic flow of information and shared robot sensory access.

In some embodiments, the rearrangement of the totes by the robots is based on a global cost metric that may account for demand and other criteria. For instance, the global cost metric can account for order patterns. An order pattern identifies different items that are commonly ordered together. For example, an order for one or more toothbrushes may commonly also include one or more tubes of toothpaste. Accordingly, the dynamic rearrangement of totes by the robots may involve the robots placing totes containing different items that are commonly ordered together on adjacent shelving. FIG. 8 illustrates an example operation of robots dynamically rearranging tote locations in response to order patterns derived from the holistic flow of information and shared robot sensory access.

In this figure, a first item in a first tote 810 is retrieved (at 805) by a first robot 820 from a first location 830 about a first shelf, and a second item in a second tote 840 is retrieved (at 805) by a second robot 850 from a second location 860 about a second shelf that is some far distance away from the first shelf or first location 830. The first and second items are part of the same customer order. The robots 820 and 850 recognize a pattern of the first item being commonly ordered with the second item based on the current and previous order history that is tracked with the shared robot sensory access. For instance, the pattern can be determined from previous instances in which one robot scans an identifier identifying the retrieval of the first tote 810, and that scan occurring within a short time threshold of another robot scanning an identifier identifying the retrieval of the second tote 840. Similarly, the pattern can be determined from shared robot sensor scans identifying the delivery of the first tote 810 to a particular order fulfillment station contemporaneously with shared robot sensor scans identifying the delivery of the second tote 840 to the particular order fulfillment station. Alternatively, the patterns could also be derived at the robot management system from analysis of the received customer orders and commonality of at least two different items in different customer orders.

Once the ordered items are extracted from the first tote 810 and the second tote 840 at the order fulfillment station, the same or different robots are tasked with returning (at 890) the totes 810 and 840 back to the warehouse shelving. Rather than return the totes 810 and 840 to the same disparate locations from which they were retrieved, the robots 820 and 850 identify the pattern that the items in the different totes 810 and 840 are ordered together. The robots 820 and 850 then identify third 870 and fourth 880 open slots about a common shelf or adjacent third and fourth shelves. Here again, the open third 870 and fourth 880 locations are identified based on the shared robot sensory access and shared scans from other robots that identify the slots opening as a result of previous tote retrievals from those locations. Stated differently, the third 870 and fourth 880 locations are identified without the robots 820 and 850 themselves having scanned the availability of those locations 870 and 880.

Robot 820 returns (at 890) the first tote 810 to the third location 870 and robot 850 returns (at 890) the second tote 840 to the fourth location 880. The robots 820 and 850 then share scans of the tote identifiers and location identifiers with the robot management system and other robots so that the other robots are made aware of the new locations of those totes 810 and 840 in real-time as well as the closing of the previously available third 870 and fourth 880 locations.

In some embodiments, the global cost metric for the dynamic rearrangement of totes by the robots accounts for item demand and item order patterns. The order pattern causes two or more totes to be placed adjacent to one another, and the demand for those totes determines how close the storage location for those totes should be to an order fulfillment station.

Other criteria that can be accounted for as part of the global cost metric for the dynamic rearrangement of totes by the robots is item or tote size and/or cost. Larger items or totes take up more space on the shelves, thereby limiting how many items or totes can be placed on that shelf. More expensive items are ordered less frequently than items priced below a certain a price point (e.g., less than $20). This translates into fewer retrievals of the more expensive items and more retrievals of the less expensive items.

In performing the dynamic rearrangement, the robots may place larger and/or more expensive items further away from the order fulfillment stations. The robots may then place smaller and/or inexpensive items closer to the order fulfillment stations. In so doing, the robots can retrieve the more frequently ordered items or totes in less time, thereby increasing the order fulfillment rate of the warehouse.

The global cost metric for performing the dynamic rearrangement of totes by the robots can account for the cost, size, demand, order patterns, and/or other criteria of the items or totes. The dynamic rearrangement may also be used to create an even distribution of the items or totes across the shelving of a warehouse such that the proximity of any given robot, regardless of the robot's location in the warehouse, to a particular item or tote is less than some partitioning of the overall warehouse space.

Figure 9:
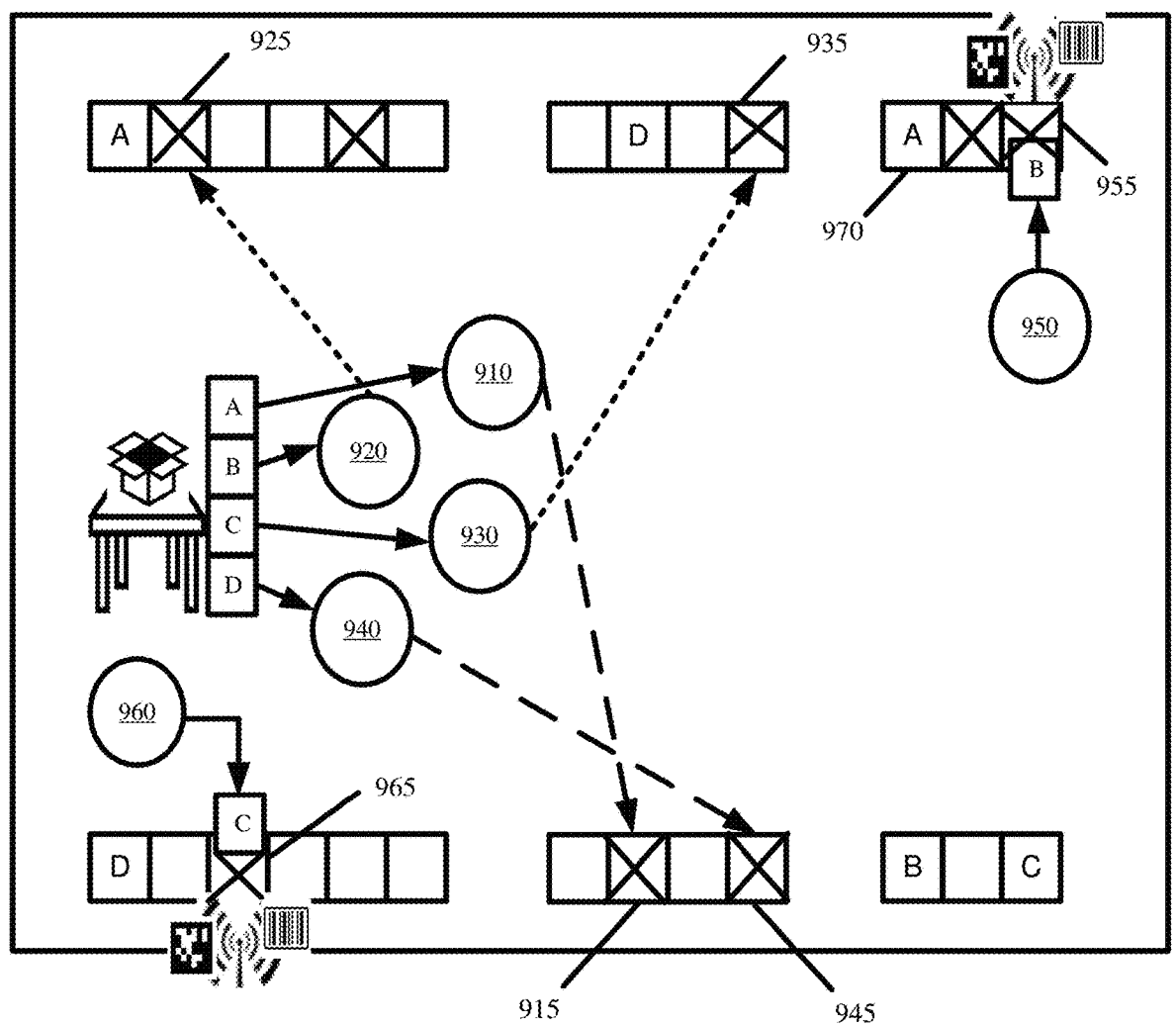
FIG. 9 conceptually illustrates the robots producing an even distribution of items or totes containing the same items across different storage locations of a warehouse.

In some such embodiments, the warehouse may have redundant totes or different totes that contain the same item. The warehouse may also have totes that contain multiple different items with two or more totes containing one or more of the same items. In performing the dynamic rearrangement, the robots distribute these totes to different locations throughout the warehouse ensuring that totes containing the same items are not located near one another. FIG. 9 conceptually illustrates the robots producing an even distribution of items or totes containing the same items across different storage locations of a warehouse.

FIG. 9 illustrates four totes at an order fulfillment station. Each tote contains some quantity of items "A", "B", "C", and "D". The robots 910, 920, 930, and 940 are tasked with returning these totes back to open slots within the warehouse shelving while also ensuring an even distribution of the tote items.

Before returning the totes, the robots 910, 920, 930, and 940 account for the storage locations of other totes within the warehouse shelving that also contain items "A", "B", "C", and "D". The storage locations for these other totes are determined based on scans or shared sensors of other robots that have returned these other totes to the warehouse shelving. For instance, robot 950 shares, with robots 910, 920, 930, and 940, scans or access to its sensors that produce scans that identify placement of a tote containing item "B" to storage location 955. Similarly, robot 960 shares, with robots 910, 920, 930, and 940, scans or access to its sensors that produce scans that identify placement of a tote containing item "C" to storage location 965.

Based on this shared robot sensory access and other shared scans from other robots, robots 910, 920, 930, and 940 can identify open storage locations for the totes containing items "A", "B", "C", and "D" that would produce an even distribution of the items relative to the current storage location of other totes containing these same items. Accordingly, robot 910 returns the tote containing item "A" to storage location 915, robot 920 returns the tote containing item "B" to storage location 925, robot 930 returns the tote containing item "C" to storage location 935, and robot 940 returns the tote containing item "D" to storage location 945. Upon returning the totes to these locations, robots 910, 920, 930, and 940 scan a first identifier of the tote identifying the items in that totes and a second identifier identifying the storage location 915, 925, 935, or 945 to which the totes are returned. These scans or access to the sensors that produce these scans are shared with the other robots and/or robot management system so that the entire system is aware of all tote locations and the items in those totes.

When a subsequent customer order is received for a particular item, a robot can be selected to retrieve the tote containing the particular item from a nearby storage location. For instance, robot 950 may be selected to retrieve a tote containing item "A". Robot 950 identifies that storage location 970 is the closest of several storage locations with a tote containing item "A", and retrieves the totes from storage location 970.

In some embodiments, the dynamic rearrangement is performed autonomously by the robots, but may be performed separately from order fulfillment. Order fulfillment may involve human labor to extract items from the retrieved totes. However, the human labor may be available for only part of the day. Accordingly, order fulfillment may occur during certain business hours. During off-hours or some time before the commencement of order fulfillment, the robots can set about dynamically rearranging the totes for more efficient retrieval when order fulfillment commences.

The robot management system may continually receive and queue customer orders during off-hours. The robot management system directs the robots in performing a batch retrieval of the totes containing the ordered items. For example, the robot management system may receive one hundred orders during off-hours. There may be sixty unique items specified in the hundred orders. Accordingly, the robots set about retrieving the totes that contain the sixty unique items.

The robots determine the storage locations for the totes containing the unique items based on previous scans from the shared access to the robot sensors. The robots then move the totes containing the unique sixty items for the hundred orders to open locations about shelving that is closest to the order fulfillment stations. The robots could also move totes that are not needed from the locations that are closer to the order fulfillment stations in order to open up slots for the totes that are needed to fulfill the one hundred orders. Identifiers for each tote that is moved, the location from which it is moved, and the location to which it is moved are scanned using one or more sensors of a robot. These sensors or scans are shared with the other robots and the robot management system, thereby providing them in real-time with the updated locations for the relocated totes and locations of the newly opened slots.

When order fulfillment commences during business hours or when human labor returns, the robots have knowledge of the new tote locations. The robots then retrieve the totes containing the unique sixty items for the hundred customer orders from the new storage locations that are closer to the order fulfillment stations such that the totes for these orders that were received overnight can be retrieved in less time than when retrieving the totes from their locations prior to the dynamic rearrangement.

In addition to or instead of rearranging the tote locations, some embodiments leverage the robots to rearrange the locations of the order fulfillment stations within the warehouse. The order fulfillment stations are the locations at which different items of at least one customer order are picked and packed together. Moving the order fulfillment stations closer to the tote locations is another means of reducing the average item or tote retrieval time.

The locations of the order fulfillment stations can vary as customer orders change over time. For example, customer orders may reflect a pattern whereby a first set of items are more frequently ordered Monday through Thursday, and a different second set of items are more frequently ordered Friday through Sunday. Rather than move each of totes containing the first and second sets of items twice a week, the robots can dynamically adjust the positions of the order fulfillment stations such that a particular order fulfillment station is placed near the totes for first set of items Monday through Thursday, and is then moved near the totes for second set of items Friday through Sunday. The robots can push the order fulfillment stations, and update the locations based on a shared sensor scan of an identifier associated with the order fulfillment station and a shared sensor scan of a second identifier for the relocated position. The relocated position can be conveyed by other sensors or beacons distributed across the warehouse.

One aspect affecting the efficiency with which the robots perform item or tote retrieval and order fulfillment is power. The robots have onboard batteries that allow them to operate anywhere in the warehouse. However, the batteries have a finite supply of power. The robots are unable to run continuously on the limited power supply and require periodic recharging.

The robots can operate in shifts in order to avoid interrupting order fulfillment for recharging. This however doubles the cost of the robots as one set of robots performs item or tote retrieval while the other set of robots charges. Operating the robots in shifts is therefore not a viable means to optimize order fulfillment at reduced cost.

Some embodiments leverage the shared robot sensory access to prolong the ability of the collective set of robots to perform order fulfillment beyond a single battery charge cycle. Some embodiments implement opportunistic charging based on the holistic flow of information and shared robot sensory access.

Opportunistic charging involves robots identifying stoppages that prevent one or more of the robots from seamless execution of a task and/or periods of downtime in which the pending tasks can be completed without all robots. The robots collaborate amongst one another to take advantage of these stoppages and periods of downtime, and opportunistically charge their batteries as other robots continue performing the pending tasks. In other words, rather than add to congestion or sit idly at a queue, one or more robots can instead charge their batteries at nearby charging stations until the congestion is alleviated or the charging robot is next in the queue. Similarly, demand will ebb and flow throughout the day. The robots can again collaborate amongst themselves to identify those in need of charging. A subset of robots can then temporarily remove themselves from the work force during the period of reduced demand and recharge their batteries, while other robots carry on the tasks ensuring continuous operation without the allocation of additional robots or other resources.

Figure 10:
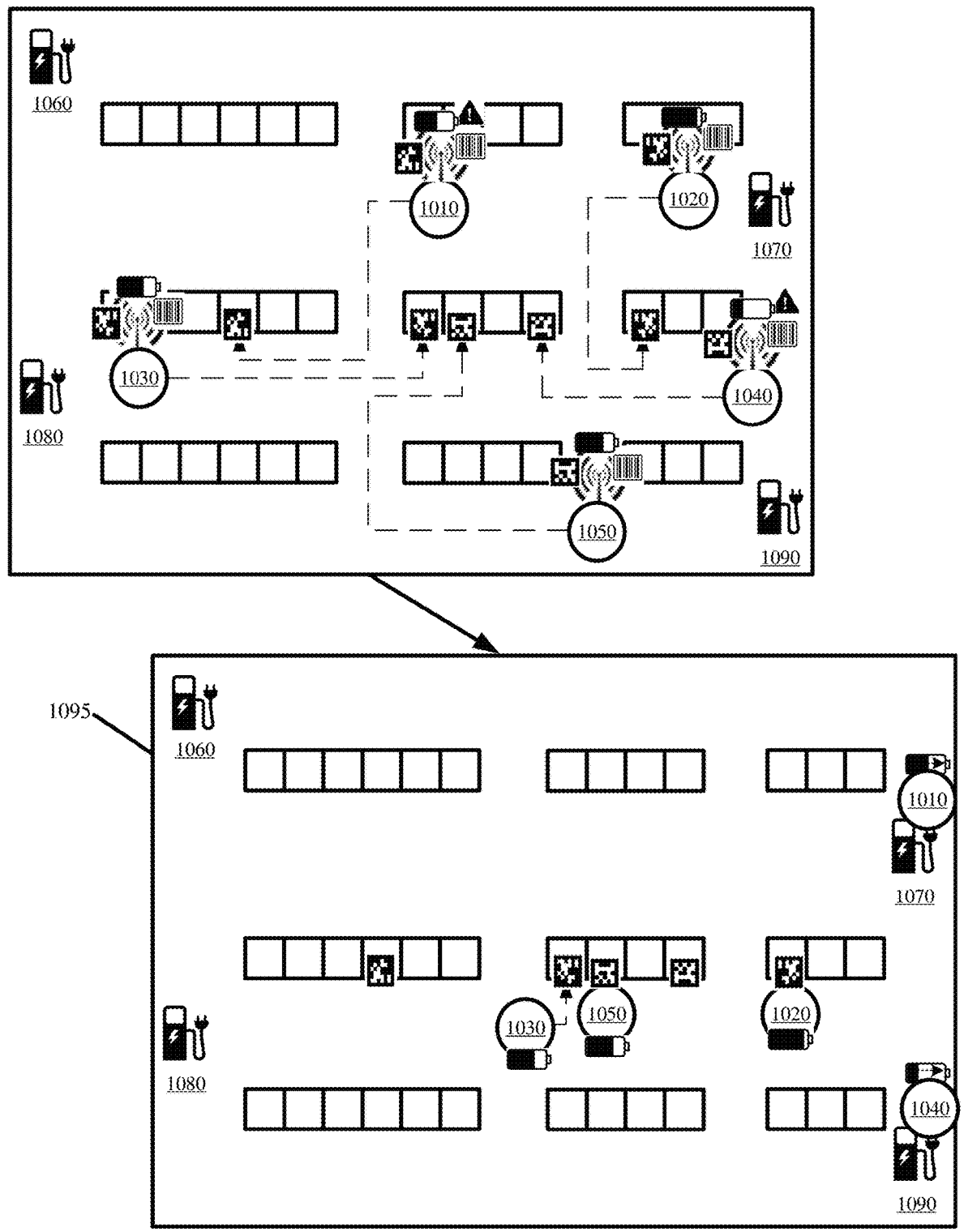
FIG. 10 conceptually illustrates robots performing opportunistic charging based on the holistic flow of information and the shared robot sensory access in accordance with some embodiments.

FIG. 10 conceptually illustrates robots performing opportunistic charging based on the holistic flow of information and the shared robot sensory access in accordance with some embodiments. The figure illustrates a set of robots 1010, 1020, 1030, 1040, and 1050 performing various order fulfillment tasks within a warehouse and a set of charging stations 1060, 1070, 1080, and 1090 at which the robots can charge their batteries.

The set of robots 1010, 1020, 1030, 1040, and 1050 are assigned tasks that require contemporaneous access to shelving within a particular aisle (i.e., the middle aisle in FIG. 10). The set of robots convey that information to one another based on the shared robot sensory access. As shown, the set of robots 1010, 1020, 1030, 1040, and 1050 broadcast location identifiers to one another. The location identifiers identify destinations in the particular aisle that each robot 1010, 1020, 1030, 1040, and 1050 is moving towards. The robots can also 1010, 1020, 1030, 1040, and 1050 send their current location based on a sensor scan of a nearby identifier. The current location with the destination location information can be used to determine the path each robot 1010, 1020, 1030, 1040, and 1050 will traversed.

From the shared scans, each robot 1010, 1020, 1030, 1040, and 1050 learns about the movements of the other robots, and based on these movements, detects congestion along the particular aisle. The congestion will cause the robots 1010, 1020, 1030, 1040, and 1050 to slow down, incur delay in performing collision avoidance, and possibly wait some amount of time in order for other robots to move out of the way before a robot can continue to its destination.

The detected congestion triggers a charging opportunity. The set of robots 1010, 1020, 1030, 1040, and 1050 determines the robots that are most in need of charging. The shared robot sensory access allows each robot of the set of robots 1010, 1020, 1030, 1040, and 1050 to check the battery state of the other robots or to notify the other robots as to its own battery state.

Depending on the amount of congestion, one or more of the set of robots 1010, 1020, 1030, 1040, and 1050 elect to opportunistically charge to reduce the congestion about the particular aisle and allow the other robots to perform their tasks more efficiently. The one or more robots that elect to opportunistically charge may be the robots with the lowest remain power. This is but one criterion with which the robots can autonomously elect which of the first set of robots should opportunistically charge.

As shown at subsequent state 1095, robots 1010 and 1040 diverge from the particular aisle and head to nearby and available charging stations for a quick battery charge. Robot 1010 moves to charger 1070, and robot 1040 moves to charger 1090. The charging time may differ depending on the amount of congestion and number of pending tasks for the robots to complete as identified from the holistic flow of information between the robots and the robot management system. Even a couple minutes of charging is beneficial as the cumulative effect of several such opportunistic charges allows the robots to operate one or more hours than they would ordinarily be able to if continuously running without the opportunistic recharging.

It should be noted that there is no net loss in order fulfillment as a result of the opportunistic charging. The robots 1010 and 1040 that go to charge reduce congestion for the other robots 1020, 1030, and 1050, thereby allowing the other robots 1020, 1030, and 1050 to complete their tasks faster than if there was congestion in the particular aisle. The robots 1010 and 1040 can resume their tasks once the other robots 1020, 1030, and 1050 have cleared out, thereby allowing the charging robots 1010 and 1040 to also perform their tasks without the congestion delays that the set of robots 1010, 1020, 1030, 1040, and 1050 would have been subjected if all attempted to simultaneously complete their tasks.

The available charging stations are detected in much the same manner as the robots detect available slots for the dynamic rearrangement of totes. Each robot may be configured with the locations of each charging station within the warehouse. Each charging station has a unique identifier. When a robot decides to recharge with an available charging station, it may reserve the charging station by signaling the other robots with the unique identifier of the charging station being reserved. The robot can also signal that it is charging at a particular charging station by arriving at the charging station, using a sensor to scan the unique identifier of the particular charging station, and sharing that scan with the other robots through the shared robot sensory access. Similarly, as the robot finishes charging, it can rescan the unique identifier of the charging station and share the scan to signal to the other robots that the charging station is again available. The shared robot sensory access allows the robots to know in real-time the charging stations that are available from those that are occupied.

Figure 11:
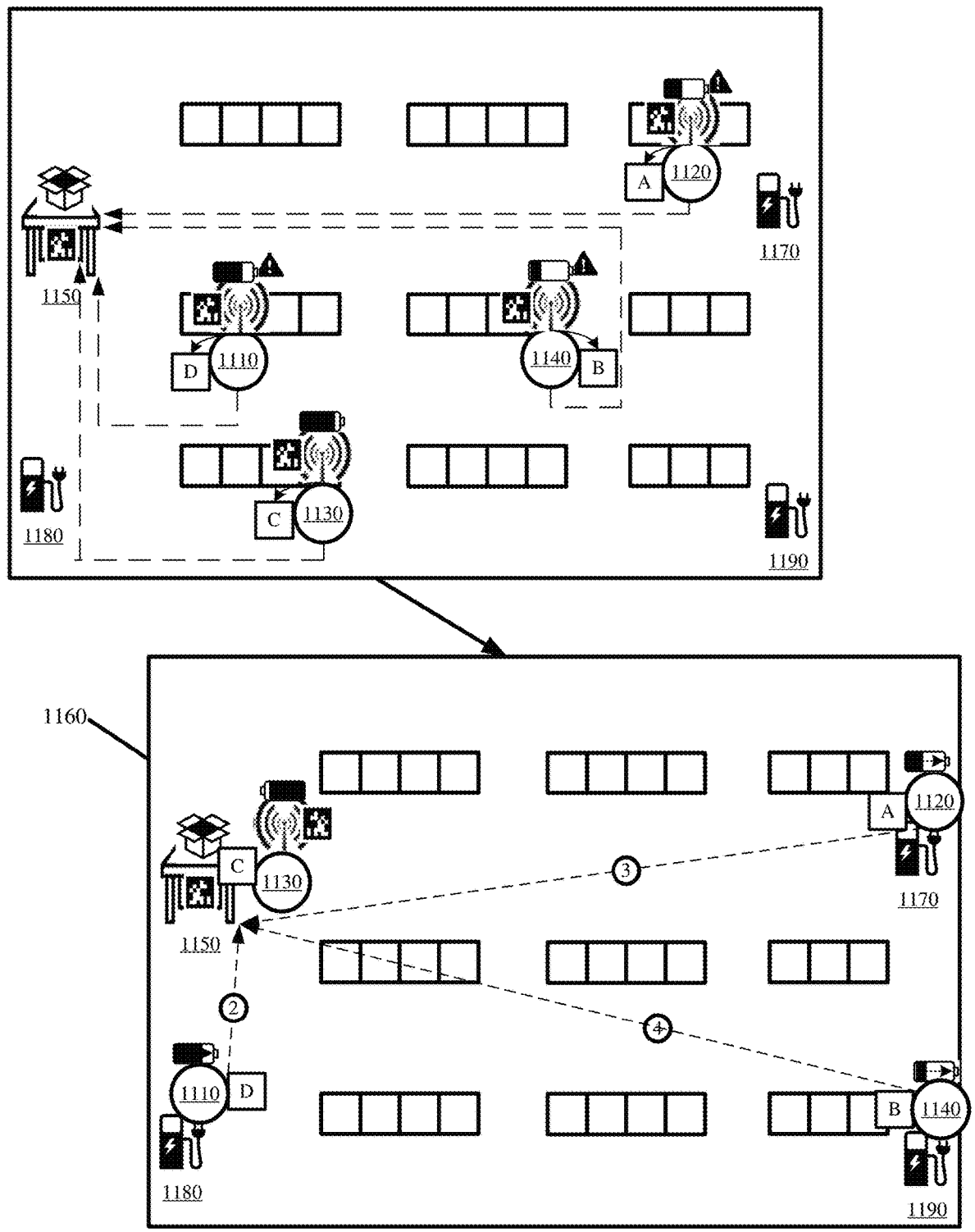
FIG. 11 conceptually illustrates robots performing opportunistic charging during downtime as determined from the holistic flow of information and the shared robot sensory access in accordance with some embodiments.

FIG. 11 conceptually illustrates robots performing opportunistic charging during downtime as determined from the holistic flow of information and the shared robot sensory access in accordance with some embodiments. Here, the set of robots 1110, 1120, 1130, and 1140 have each retrieved a tote that contains items for fulfilling a particular customer order.

The set of robots 1110, 1120, 1130, and 1140 is tasked with delivering the totes to the same order fulfillment station 1150. This however would cause the robots to queue and sit idly at the order fulfillment station 1150. In particular, a first robot that arrives at the order fulfillment station 1150 waits at the order fulfillment station 1150 until items from the retrieved tote are extracted in a specified quantity for the customer order before the first robot departs from the order fulfillment station 1150 and another robot takes its place.

Rather than queue at the order fulfillment station 1150 and sit idly, FIG. 11 illustrates the robots 1110, 1120, 1130, and 1140 using the shared robot sensory access in order to detect which robots of the set of robots 1110, 1120, 1130, and 1140 have the lowest charge level. As shown in state 1160, the robots most in need of charge (i.e., 1110, 1120, and 1140) do not enter or exit the order fulfillment station 1150 queue and head to nearby charging stations 1170, 1180, and 1190. Robot 1130 has the most charge and heads to the order fulfillment station 1150. When the tote retrieved by that robot 1130 is no longer needed at the order fulfillment station 1150, the robot 1130 can signal that it is departing from the order fulfillment station 1150 by scanning the station identifier and sharing that scan with the other robots 1110, 1120, and 1140. The other robots 1110, 1120, and 1140 check their battery levels. The robot with the next highest charge (i.e., 1110) leaves the charging station 1180, and delivers its tote to the order fulfillment station 1150. This process continues until all the totes have been delivered with the robot 1140 having the lowest level of charge being permitted to opportunistically charge the longest amount of time.

In some embodiments, the robots may drop-off retrieved totes at an order fulfillment station or pick wall without waiting for the ordered items in the totes to be picked. Rather than send those same robots without any totes back into the warehouse to retrieve other totes, it may be more efficient to have those robots stay near the order fulfillment station or pick wall until a tote is no longer needed and can be returned back to the warehouse shelving. Thus, after dropping off a tote at an order fulfillment station, the robot can opportunistically charge until a tote is readied for return.

Figure 12:
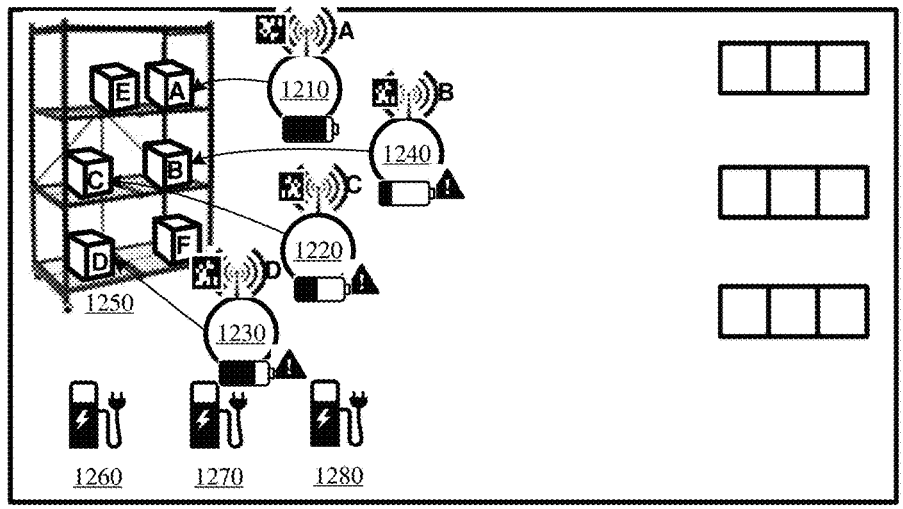
FIG. 12 conceptually illustrates robots opportunistically charging in between completing a retrieval and waiting for a return in accordance with some embodiments.
Figure 12:
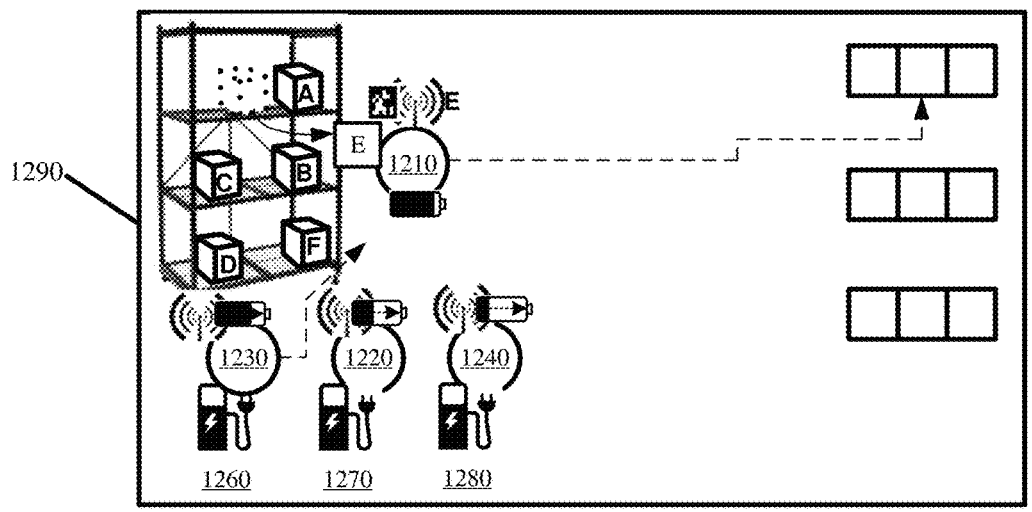
Figure 12:
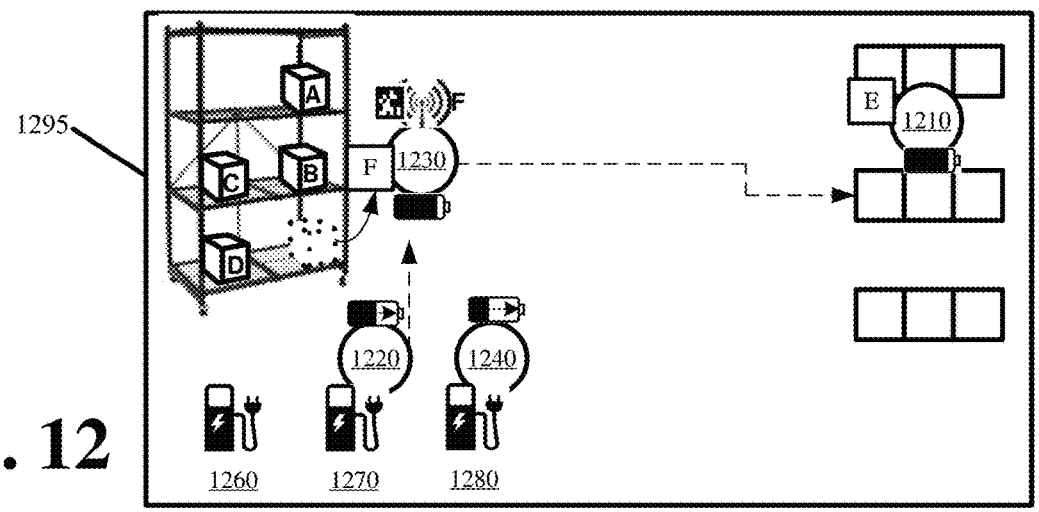

FIG. 12 conceptually illustrates robots opportunistically charging in between completing a retrieval and waiting for a return in accordance with some embodiments. In this figure, a set of robots 1210, 1220, 1230, and 1240 retrieve different totes from different warehouse locations and deliver the retrieved totes to an order fulfillment station 1250 or pick wall. The robots 1210, 1220, 1230, and 1240 drop-off the totes at the order fulfillment station 1250, and the robots most in need of charging (i.e., robots 1220, 1230, and 1240) head to available charging stations 1260, 1270, and 1280 near the order fulfillment station 1250 to opportunistically charge.

Human or robotic pickers (not shown) pick desired items from the totes at the order fulfillment station 1250. Each picked item is scanned with a scanner and the scans are shared with the robots 1210, 1220, 1230, and 1240. From shared access to these scans or one or more scanners at the order fulfillment station 1250, and having holistic knowledge of the quantity of items that are to be retrieved, the robots 1210, 1220, 1230, and 1240 can detect when a first tote is ready to be returned from the order fulfillment station 1250 back into the warehouse shelving.

At state 1290, the robot 1210 at the order fulfillment station 1250 returns the first tote back into the warehouse shelving. In returning the first tote, the robot 1210 can implement the dynamic rearrangement to identify a more efficient placement of the first tote in the warehouse than where it was originally retrieved from. Robot 1210 is not necessarily the robot that originally retrieved the first tote to the order fulfillment station 1250.

The remaining robots nearby that are charging (i.e., robots 1220, 1230, and 1240) then collaborate amongst themselves to determine which of the robots 1220, 1230, and 1240 has the most charge. Here again, the robots 1220, 1230, and 1240 leverage the shared robot sensory access to detect the battery level of the other robots at the nearby charging stations 1260, 1270, and 1280.

At state 1295, the robot with the next most charge (i.e., 1230) then departs from the charging station 1260, moves to the order fulfillment station 1250, and retrieves the next tote that is to be returned to the warehouse shelving. The same process occurs with a second tote and other totes at the pick wall 1250. The robots return the totes based on their charge level, allowing those robots the most in need of charging to charge the longest.

As noted above, opportunistic charging also occurs with respect to demand or the incoming order rate. Customers may have reliable ordering behavior. The highest rate of orders may arrive at specific times of the day. During the times of high order rate, all robots are actively and continuously retrieving totes and operating to fulfill customer orders. As the order rate drops, the robots take turns opportunistically charging so that a small subset of the robots are charging while a larger subset of the robots continue operating.

The selection of which robots to charge is again based on the holistic flow of information between the robots and the robot management system, as well as, the shared robot sensory access. The holistic flow of information allows the robots or robot management system to autonomously and in real-time track a dip in the order rate as well as translate that dip into a number of robots that can simultaneously charge while the other robots keep up with the current demand. The shared robot sensory access allows the robots to decide amongst themselves which robots are most in need of charging and which can continue operating.

The shared robot sensory access can also be leveraged to preserve charge and increase running time of the robots. For instance, reducing robot speed is one way with which the robots can preserve change and increase running time. In some embodiments, the robots preserve charge by reducing their speed when congestion or queues are detected based on the shared access to the sensor or sensor information of other robots. With reference back to FIG. 10, the robots can share sensor access and sensor scans with one another to determine that the robots will converge to a common aisle and that congestion will result if the robots arrive at or near the same time. FIG. 10 resolved the congestion based on some robots diverging from the particular aisle and opportunistically charging. Alternatively or additionally, a first set of robots with the least amount of remaining charge can reduce their speed in order to arrive at the particular aisle after a second set of robots with more charge have arrived and/or completed their tasks in the particular aisle. By reducing their speed and arriving later, the first set of robots relieve the congestion in the particular aisle, but also preserve charge such that the first set of robots can run for a longer period of time than if they were operating at full speed.

Robots can also preserve charge and reduce their speed in response to detecting a queue or wait at an order fulfillment station to which the robots are to deliver totes. In particular, the robots can determine the queue length based on other robots identifying their location at the order fulfillment station. The robots can then adjust their speed to arrive once there is no wait. For example, if there is a first robot at an order fulfillment station, a second robot can reduce its speed by half to arrive after the first robot leaves. If there are first and second robots at the order fulfillment station, a third robot can reduce its speed by three quarters to arrive after the first and second robots leave.

Collisions can similarly be avoided. For example, first and second robots may be headed towards one another. The first robot shares a scan with the second robot indicating that the robot will turn at some point before the location of the second robot. In response to the shared scan, the second robot can reduce its speed and preserve charge to avoid coming into range of the first robot before the first robot completes the turn.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a plurality of orders in a particular sequence at a robot management system, each order of the plurality of orders involving a different set of items;
   determining, by execution of one or more machines of the robot management system, that a first order has at least a particular item in common with a second order, wherein the second order is at least two or more orders removed from the first order in the particular sequence of the plurality of orders;
   determining, by execution of the one or more machines, a total quantity of the particular item ordered as part of the plurality of orders based on a first quantity of the particular item ordered as part of the first order and a second quantity of the particular item ordered as part of the second order;
   selecting a particular robot from a plurality of robots under control of the robot management system;
   controlling the particular robot in transferring an object containing at least the total quantity of the particular item from a storage location to an order fulfillment station; and
   performing an out-of-order fulfillment of the plurality of orders at the order fulfillment station by coordinating extraction of the total quantity of the particular item from the object upon transfer of the object by the particular robot to the order fulfillment station, wherein performing the out-of-order fulfillment comprises fulfilling the particular item for the first order and the second order before fulfilling an item of a third order that is received before at least one of the first order and the second order in the particular sequence.

2. The method of claim 1 further comprising:
determining, by execution of the one or more machines, a third quantity of a second item, that is different than the particular item, of the second order that is not ordered as part of the first order;
controlling a second robot of the plurality of robots, that is different than the particular robot, in transferring a second object containing at least the third quantity of the second item from a different storage location to the order fulfillment station; and
continuing the out-of-order fulfillment of the plurality of orders at the order fulfillment station by coordinating extraction of the third quantity of the second item from the second object before transfer of a third object containing any item of the third order.

3. The method of claim 2 further comprising:
fulfilling the different set of items for the first order and the second order at the order fulfillment station before any items of the third order are fulfilled at the order fulfillment station; and
controlling a third robot of the plurality of robots in transferring an object containing a third item, that is ordered as part of the third order and is not ordered as part of the first order or the second order, from a storage location to the order fulfillment station in response to fulfilling the different set of items for the first order and the second order at the order fulfillment station.

4. The method of claim 1 further comprising:
determining that the first order has a second item, that is different than the particular item, in common with a fourth order that is at least two or more orders removed from the first order in the particular sequence of the plurality of orders;
determining, by execution of the one or more machines, a total quantity of the second item ordered as part of the plurality of orders based on a third quantity of the second item ordered as part of the first order and a fourth quantity of the second item ordered as part of the fourth order;
controlling a second robot of the plurality of robots, that is different than the particular robot, in transferring a second object containing at least the total quantity of the second item from a different storage location to the order fulfillment station; and
continuing the out-of-order fulfillment of the plurality of orders at the order fulfillment station by coordinating extraction of the total quantity of the second item from the second object before transfer of a third object containing any item of the third order.

5. The method of claim 1, wherein determining the total quantity of the particular item ordered as part of the plurality of orders is further based on an expected quantity of the particular item for orders arriving after the plurality orders and after commencing fulfillment of the first order and the second order.

6. The method of claim 1 further comprising:
returning a first object from the order fulfillment station to a first storage location with the particular robot;
identifying a next item, that is ordered as part of one or more of the plurality of orders and that is stored in a second object at a storage location that is closest to the first storage location relative to storage locations of other objects containing other items of the plurality of orders, wherein the one or more orders is not a next order in the particular sequence that follows the first order or the second order;
controlling the particular robot in moving from the first storage location to the second storage location after returning the first object to the first storage location.

7. The method of claim 6 further comprising:
determining, by execution of the one or more machines, a total quantity of the next item ordered as part of the one or more orders; and
continuing the out-of-order fulfillment of the plurality of orders at the order fulfillment station by coordinating extraction of the total quantity of the next item from the second object.

8. The method of claim 6 further comprising:
identifying the first storage location based on the particular robot scanning a first identifier at the first storage location;
locating storage locations of objects containing each distinct item ordered as part of the plurality of orders;
determining different storage locations of objects containing each distinct item that is ordered as part of the plurality of orders; and
providing the particular robot with a second identifier for locating the second object at the second storage location that is closest to the first storage location.

9. The method of claim 1, wherein selecting the particular robot comprises:
detecting a proximity of each robot of the plurality of robots to the storage location of the object;
detecting a travel orientation of each robot of the plurality of robots relative to the storage location of the object; and
assigning a first robot for said transferring of the object based on detecting the first robot to be farther away from the storage location than a second robot of the plurality of robots and based on detecting the first robot to have a travel orientation towards the storage location and the second robot to have a travel orientation away from the storage location, wherein a time to change orientation of the second robot is greater than a time for the first robot to move closer to the storage location than the second robot.

10. The method of claim 1, wherein selecting the particular robot comprises:
computing a first object retrieval time based on a first distance between a first robot of the plurality of robots and the storage location, and based on the first robot having a travel orientation towards the storage location;
computing a second object retrieval time based on a second distance between a second robot of the plurality of robots and the storage location, and based on the second robot having a travel orientation away from the storage location, wherein the first distance is greater than the second distance; and
determining that the first object retrieval time is less than the second object retrieval time due to a time to change orientation of the second robot being greater than a time for the first robot to travel a difference between the first distance and the second distance.

11. The method of claim 1, wherein selecting the particular robot comprises:
detecting a travel orientation of each robot of the plurality of robots relative to the storage location of the object;
detecting tasks assigned by the one or more machines to each robot of the plurality of robots; and assigning a first robot of the plurality of robots for said transferring of the object based on detecting the first robot to be farther away from the storage location than a second robot of the plurality of robots and based on detecting the first robot to be available and the second robot performing a previously assigned task.

12. The method of claim 1, wherein selecting the particular robot comprises:
detecting a proximity of each robot of the plurality of robots to the storage location of the object;
detecting tasks assigned by the one or more machines to each robot of the plurality of robots;
assigning a first robot of the plurality of robots for said transferring of the object based on detecting the first robot to have a travel orientation towards the storage location and the second robot to have a travel orientation away from the storage location and based on detecting the first robot to be performing a previously assigned task and the second robot to be available, wherein a time for the first robot to complete the previously assigned task and reach the storage location is less than a time for the second robot to change orientation and reach the storage location.

13. The method of claim 1, wherein the particular robot comprises a motorized base and a mechanical retriever, wherein transferring the object comprises moving the motorized base from a first location to a second location corresponding to the storage location of the object, and extracting the object from the storage location with the mechanical retriever.

14. The method of claim 13, wherein the particular robot further comprises at least one scanner, and wherein transferring the object further comprises scanning an identifier identifying the object with the at least one scanner a first time to signal retrieval of the object from the storage location, and scanning the identifier a second time upon arriving at the order fulfillment station to signal transfer of the object to the order fulfillment station.

15. A system comprising:
a plurality of robots;
an order fulfillment station; and
one or more processors configured to:
receive a plurality of orders in a particular sequence, each order of the plurality of orders involving a different set of items;
determine that a first order has at least a particular item in common with a second order, wherein the second order is at least two or more orders removed from the first order in the particular sequence of the plurality of orders;
determine a total quantity of the particular item ordered as part of the plurality of orders based on a first quantity of the particular item ordered as part of the first order and a second quantity of the particular item ordered as part of the second order;
select a particular robot from the plurality of robots;
control the particular robot in transferring an object containing at least the total quantity of the particular item from a storage location to the order fulfillment station; and
perform an out-of-order fulfillment of the plurality of orders at the order fulfillment station by coordinating extraction of the total quantity of the particular item from the object upon transfer of the object by the particular robot to the order fulfillment station, wherein performing the out-of-order fulfillment comprises fulfilling the particular item for the first order and the second order before fulfilling an item of a third order that is received before at least one of the first order and the second order in the particular sequence.

16. The system of claim 15, wherein the one or more processors are further configured to:
determine a third quantity of a second item, that is different than the particular item, of the second order that is not ordered as part of the first order;
control a second robot of the plurality of robots, that is different than the particular robot, in transferring a second object containing at least the third quantity of the second item from a different storage location to the order fulfillment station; and
continue the out-of-order fulfillment of the plurality of orders at the order fulfillment station by coordinating extraction of the third quantity of the second item from the second object before transfer of a third object containing any item of the third order.

17. The system of claim 16, wherein the one or more processors are further configured to:
fulfill the different set of items for the first order and the second order at the order fulfillment station before any items of the third order are fulfilled at the order fulfillment station; and
control a third robot of the plurality of robots in transferring an object containing a third item, that is ordered as part of the third order and is not ordered as part of the first order or the second order, from a storage location to the order fulfillment station in response to fulfilling the different set of items for the first order and the second order at the order fulfillment station.

18. The system of claim 15, wherein the one or more processors are further configured to:
return a first object from the order fulfillment station to a first storage location with the particular robot;
identify a next item, that is ordered as part of one or more of the plurality of orders and that is stored in a second object at a storage location that is closest to the first storage location relative to storage locations of other objects containing other items of the plurality of orders, wherein the one or more orders is not a next order in the particular sequence that follows the first order or the second order;
control the particular robot in moving from the first storage location to the second storage location after returning the first object to the first storage location.

19. The system of claim 15, wherein selecting the particular robot comprises:
detect a proximity of each robot of the plurality of robots to the storage location of the object;
detect a travel orientation of each robot of the plurality of robots relative to the storage location of the object; and
assign a first robot for said transferring of the object based on detecting the first robot to be farther away from the storage location than a second robot of the plurality of robots and based on detecting the first robot to have a travel orientation towards the storage location and the second robot to have a travel orientation away from the storage location, wherein a time to change orientation of the second robot is greater than a time for the first robot to move closer to the storage location than the second robot.

20. A non-transitory computer-readable medium storing program instructions that, when executed by one or more machines of a robot management system, cause the robot management system to perform operations comprising:

receive a plurality of orders in a particular sequence, each order of the plurality of orders involving a different set of items;

determine that a first order has at least a particular item in common with a second order, wherein the second order is at least two or more orders removed from the first order in the particular sequence of the plurality of orders;

determine a total quantity of the particular item ordered as part of the plurality of orders based on a first quantity of the particular item ordered as part of the first order and a second quantity of the particular item ordered as part of the second order;

select a particular robot from a plurality of robots;

control the particular robot in transferring an object containing at least the total quantity of the particular item from a storage location to an order fulfillment station; and perform an out-of-order fulfillment of the plurality of orders at the order fulfillment station by coordinating extraction of the total quantity of the particular item from the object upon transfer of the object by the particular robot to the order fulfillment station, wherein performing the out-of-order fulfillment comprises fulfilling the particular item for the first order and the second order before fulfilling an item of a third order that is received before at least one of the first order and the second order in the particular sequence.

* * * * *